US012577966B2

(12) United States Patent
    Rezaei

(10) Patent No.: US 12,577,966 B2
(45) Date of Patent: Mar. 17, 2026

(54) WELD CAP AND PLUG WELDS FOR FLUID DELIVERY SYSTEMS

(71) Applicant: Compart Systems Pte. Ltd., Singapore (SG)

(72) Inventor: Frederick Rezaei, Phoenix, AZ (US)

(73) Assignee: Compart Systems Pte. Ltd., Singapore (SG)

( * ) Notice: Subject to any disclaimer, the term of this patent is extended or adjusted under 35 U.S.C. 154(b) by 1223 days.

(21) Appl. No.: 16/774,915

(22) Filed: Jan. 28, 2020

(65) Prior Publication Data

US 2020/0240565 A1 Jul. 30, 2020

Related U.S. Application Data

(60) Provisional application No. 62/798,371, filed on Jan. 29, 2019.

(51) Int. Cl.

| *F15B 13/08* | (2006.01) |
| *B23K 15/04* | (2006.01) |
| *B23K 101/04* | (2006.01) |
| *F04B 53/16* | (2006.01) |
| *F16L 41/02* | (2006.01) |

(Continued)

(52) U.S. Cl.

CPC .......... *F15B 13/0814* (2013.01); *B23K 15/04* (2013.01); *F04B 53/16* (2013.01); *F15B 13/0803* (2013.01); *F15B 13/0807* (2013.01); *F15B 13/0817* (2013.01); *F16L 41/02* (2013.01); *F16L 41/025* (2013.01);

(Continued)

(58) Field of Classification Search

CPC ......... F16L 41/03; F16L 41/02; F16L 41/025; F16L 41/084; F16L 41/082; F15B 13/0803; F15B 13/0807; F15B 13/0814; F15B 13/0817; F04B 53/16; F16K 27/003; B23K 15/04

See application file for complete search history.

(56) References Cited

U.S. PATENT DOCUMENTS

| 3,278,156 A | 10/1966 | Callahan et al. |
| 3,521,910 A | 7/1970 | Callahan et al. |

(Continued)

FOREIGN PATENT DOCUMENTS

| CN | 101896307 A | 11/2010 |
| CN | 202391550 U | 8/2012 |

(Continued)

*Primary Examiner* — Atif H Chaudry
(74) *Attorney, Agent, or Firm* — Dykema Gossett PLLC

(57) ABSTRACT

A flow substrate comprising a substrate body formed from a solid block of a first material, the substrate body having a first surface and a second surface opposing the first surface, a plurality of pairs of component conduit ports defined in the first surface of the substrate body, a plurality of fluid pathways extending between each respective pair of component conduit ports and in fluid communication with each component conduit port of the respective pair of component conduit ports, each respective fluid pathway being formed in the second surface of the substrate body; and at least one cap formed from a second material, the at least one cap having a first cap surface that is constructed to seal at least one fluid pathway, and a second cap surface opposing the first surface, wherein the substrate body includes an opening configured to couple with the at least one cap.

3 Claims, 25 Drawing Sheets

(51) Int. Cl.
  F16L 41/03    (2006.01)
  F16L 41/08    (2006.01)

(52) U.S. Cl.
  CPC ............. F16L 41/03 (2013.01); F16L 41/082
     (2013.01); F16L 41/084 (2013.01); *B23K*
               *2101/04* (2018.08)

(56)      References Cited

U.S. PATENT DOCUMENTS

| | | | |
|---|---|---|---|
| 4,278,892 A * | 7/1981 | Baatz | G21F 5/12 |
| | | | 976/DIG. 348 |
| 5,730,423 A | 3/1998 | Wu et al. | |
| 5,803,507 A | 9/1998 | Vu | |
| 6,357,760 B1 | 3/2002 | Doyle | |
| 7,307,247 B2 | 12/2007 | Bower et al. | |
| 8,307,854 B1 | 11/2012 | Vu | |
| 8,496,029 B2 | 7/2013 | Vu | |
| 2010/0313976 A1 | 12/2010 | Vu | |
| 2014/0020779 A1 | 1/2014 | Vu | |
| 2019/0120398 A1 | 4/2019 | Bruczuk et al. | |

FOREIGN PATENT DOCUMENTS

| | | |
|---|---|---|
| CN | 108352466 A | 7/2018 |
| JP | H11273637 A | 10/1999 |
| JP | 2007-134156 A | 5/2007 |
| JP | 2009-146645 A | 7/2009 |
| WO | 2017/182149 A1 | 10/2017 |

* cited by examiner

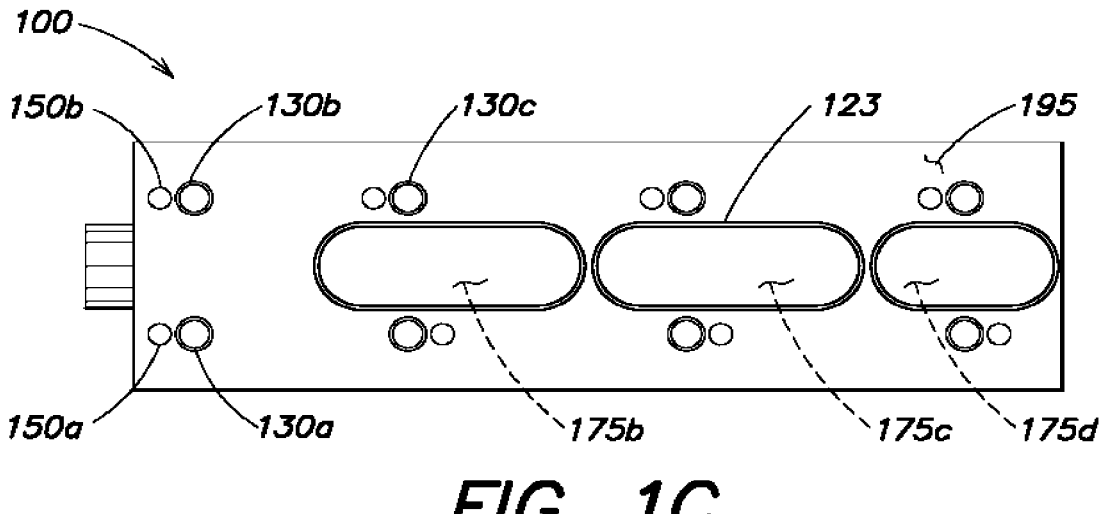
FIG. 1C
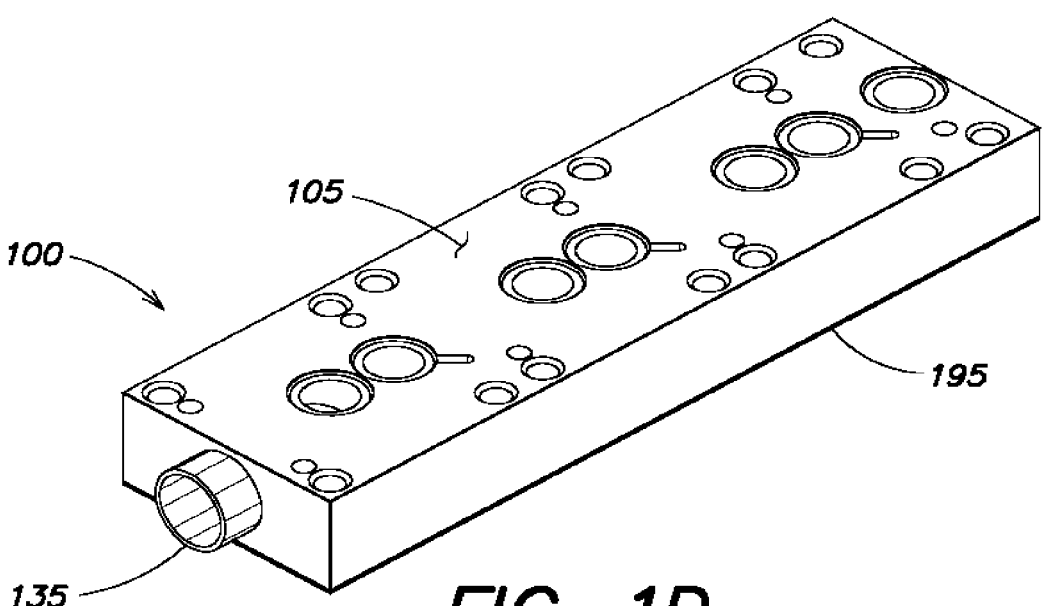
FIG. 1D
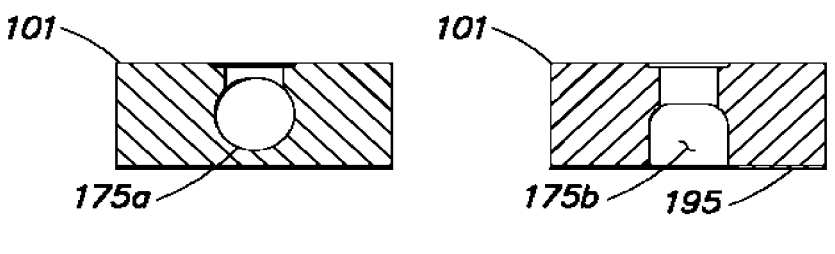
FIG. 1E    FIG. 1F

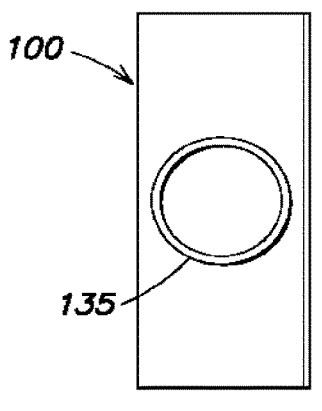
FIG. 1G
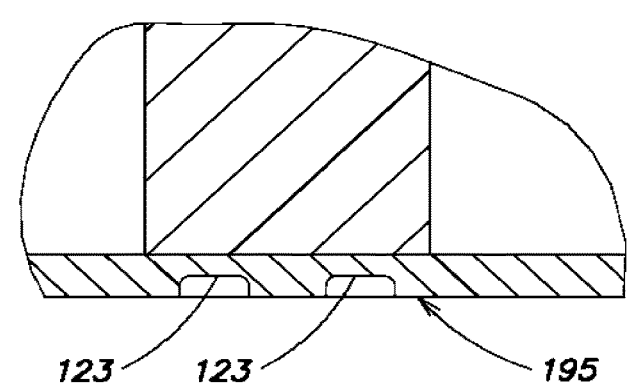
FIG. 1H
FIG. 1I

WELD CAP AND PLUG WELDS FOR FLUID DELIVERY SYSTEMS

CROSS-REFERENCE TO RELATED APPLICATION

This application claims the benefit of U.S. provisional application No. 62/798,371, filed 29 Jan. 2019, which is hereby incorporated by reference as though fully set forth herein.

FIELD OF THE DISCLOSURE

The present invention is directed to fluid delivery systems, and more particularly to extreme flow rate and/or high temperature surface mount fluid delivery systems for use in the semiconductor processing, pharmaceutical and petrochemical industries.

BACKGROUND OF THE ART

Fluid delivery systems are used in many modern industrial processes for conditioning and manipulating fluid flows to provide controlled admittance of desired substances into the processes. Practitioners have developed an entire class of fluid delivery systems which have fluid handling components removably attached to flow substrates containing fluid pathway conduits. The arrangement of such flow substrates establishes the flow sequence by which the fluid handling components provide the desired fluid conditioning and control. The interface between such flow substrates and removable fluid handling components is standardized and of few variations. Such fluid delivery system designs are often described as modular or surface mount systems. Representative applications of modular and surface mount fluid delivery systems include gas panels used in semiconductor manufacturing equipment and sampling systems used in petrochemical refining. The many types of manufacturing equipment used to perform process steps making semiconductors are collectively referred to as tools. Embodiments of the present invention relate generally to fluid delivery systems for semiconductor processing and specifically to surface mount fluid delivery systems that use the standard temperature but specifically well suited for use in extreme flow rate and/or high temperature applications where the process fluid is to be heated to a temperature above ambient. Aspects of the present invention are applicable to surface mount fluid delivery system designs whether of a localized nature or distributed around a semiconductor processing tool.

Industrial process fluid delivery systems have fluid pathway conduits fabricated from a material chosen according to its mechanical properties and considerations of potential chemical interaction with the fluid being delivered. Stainless steels and high nickel alloys are commonly chosen for corrosion resistance and robustness, but aluminum, other alloys may be suitable in some situations where cost and ease of fabrication are of greater concern. Fluid pathways may also be constructed from polymer materials in applications where possible ionic contamination of the fluid would preclude using metals. The method of sealingly joining the fluid handling components to the flow substrate fluid pathway conduits is usually standardized within a particular surface mount system design in order to minimize the number of distinct part types. Most joining methods use a deformable gasket interposed between the fluid component and the flow substrate to which it is attached. Gaskets may be simple elastomeric O-Rings or specialized metal sealing rings such as seen in U.S. Pat. No. 5,803,507 and U.S. Pat. No. 6,357,760. Providing controlled delivery of high purity fluids in semiconductor manufacturing equipment has been of concern since the beginning of the semiconductor electronics industry and the construction of fluid delivery systems using mostly metallic seals was an early development. One early example of a suitable bellows sealed valve is seen in U.S. Pat. No. 3,278,156, while the widely used VCR® fitting for joining fluid conduits is seen in U.S. Pat. No. 3,521,910, and a typical early diaphragm sealed valve is seen in U.S. Pat. No. 5,730,423 for example. The recent commercial interest in photovoltaic solar cell fabrication, which has less stringent purity requirements than needed for making the newest microprocessor devices, may bring a return to fluid delivery system using elastomeric seals.

A collection of fluid handling components assembled into a sequence intended for handling a single fluid species is frequently referred to as a gas stick. The equipment subsystem comprised of several gas sticks intended to deliver process fluid to a particular semiconductor processing chamber is often called a gas panel. During the 1990s several inventors attacked problems of gas panel maintainability and size by creating gas sticks wherein the general fluid flow path is comprised of passive metallic structures, containing the conduits through which process fluid moves, with valves and like active (and passive) fluid handling components removably attached thereto. The passive fluid flow path elements have been variously called manifolds, substrates, blocks, and the like, with some inconsistency even within the work of individual inventors. This disclosure chooses to use the terminology flow substrate to indicate fluid delivery system elements which contain passive fluid flow path(s) that may have other fluid handling devices mounted there upon.

SUMMARY OF THE INVENTION

Embodiments of the present invention are directed to a surface mount fluid delivery flow substrate for normal process condition but specifically adapted for use in extreme flow rate and/or high temperature applications where the process fluid is to be heated (or cooled) to a temperature above (or below) that of the ambient environment. As used herein, and in the context of semiconductor process fluid delivery systems, the expression "extreme flow rate" corresponds to gas flow rates above approximately 50 SLM or below approximately 50 SCCM. A significant aspect of the present invention is the ability to fabricate flow substrates having fluid pathway conduits with a cross-sectional area (size) substantially larger or smaller than other surface mount architectures.

Flow substrates in accordance with the present invention may be used to form a portion of a gas stick, or may be used to form an entire gas stick. Certain embodiments of the present invention may be used to implement an entire gas panel using only a single flow substrate. Flow substrates of the present invention may be securely fastened to a standardized stick bracket, such as that described in U.S. Pat. No. 8,307,854 (hereinafter, "'854 patent"), thereby providing firm mechanical alignment and thereby obviating need for any interlocking flange structures among the flow substrates. In addition, flow substrates of the present invention may be adapted as described in the '854 patent to additionally provide one or more manifold connection ports and thereby allow transverse connections between fluid delivery sticks. The '854 patent is hereby incorporated by reference as if set forth fully herein.

The flow substrate configurations of the present invention may be adjusted for use with valves and other fluid handling components having symmetric port placement (e.g., W-seal devices) or asymmetric port placement (e.g., standard "C-Seal" devices) on the valve (or other fluid handling component) mounting face. Only asymmetric designs are shown herein because such devices are most commonly available in the semiconductor equipment marketplace.

In accordance with one embodiment, a flow substrate comprises a substrate body formed from a solid block of a first material, the substrate body having a first surface and a second surface opposing the first surface; a plurality of pairs of component conduit ports defined in the first surface of the substrate body; a plurality of fluid pathways extending between each respective pair of component conduit ports and in fluid communication with each component conduit port of the respective pair of component conduit ports, each respective fluid pathway being formed in the second surface of the substrate body; and at least one cap formed from a second material, the at least one cap having a first cap surface that is constructed to seal at least one fluid pathway of the plurality of fluid pathways, and a second cap surface opposing the first surface; wherein the substrate body includes an opening configured to couple with the at least one cap.

In accordance with another embodiment, a method of forming a substrate body comprises placing a weld cap proximate an opening in the substrate body; pressing one or more of the weld cap and the substrate body with a pressing tool, wherein the pressing tool comprises a pressing element; securing the weld cap to the substrate body through a swaged joint formed as a result of said pressing.

In accordance with yet another embodiment, a method of forming a substrate body comprises placing a plug proximate an opening in the substrate body; pressing one or more of the plug and the substrate body with a pressing tool, wherein the pressing tool comprises a pressing element; securing the plug to the substrate body through a swaged joint formed as a result of said pressing.

In accordance with yet another embodiment, a method of forming a substrate body comprises placing a tube stub proximate an opening in the substrate body; pressing one or more of the tube stub and the substrate body with a pressing tool, wherein the pressing tool comprises a pressing element; securing the tube stub to the substrate body through a swaged joint formed as a result of said pressing.

BRIEF DESCRIPTION

FIG. 1C illustrates a view of the flow substrate of FIGS. 1A and 1B from below.

FIG. 1D is an elevational view of the flow substrate of FIGS. 1A-C.

FIG. 1E is a cross-sectional view of the flow substrate of FIG. 1B taken along line B-B in FIG. 1B.

FIG. 1F is a cross-sectional view of the flow substrate of FIG. 1B taken along line C-C in FIG. 1B.

FIG. 1G is an end view of the flow substrate of FIGS. 1A-F.

FIG. 1H is an exploded view of a portion of the flow substrate depicted in FIG. 1B.

FIG. 1I is an elevational view of the flow substrate of FIGS. 1A-H from below.

Figure 12A:
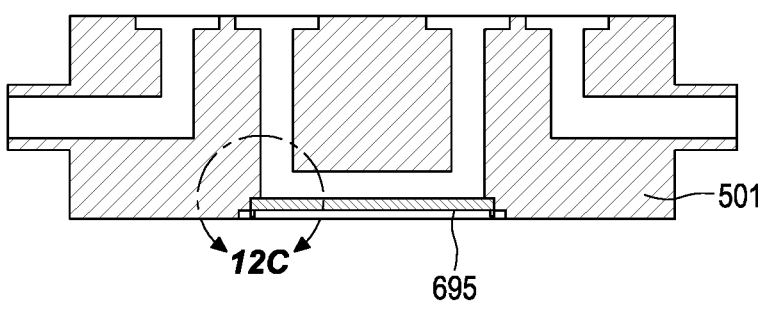
FIG. 12A is a cross-sectional view of another embodiment of a flow substrate, in accordance with an aspect of the present invention.

FIG. 12B1 is an exploded cross-sectional view of a portion of the flow substrate of FIG. 12A with a rounded edge proximate an opening, in accordance with an aspect of the present invention.

FIG. 12B2 is the exploded cross-sectional view of the portion of the flow substrate of FIG. 12A with a square edge proximate an opening, in accordance with an aspect of the present invention.

Figure 12C:
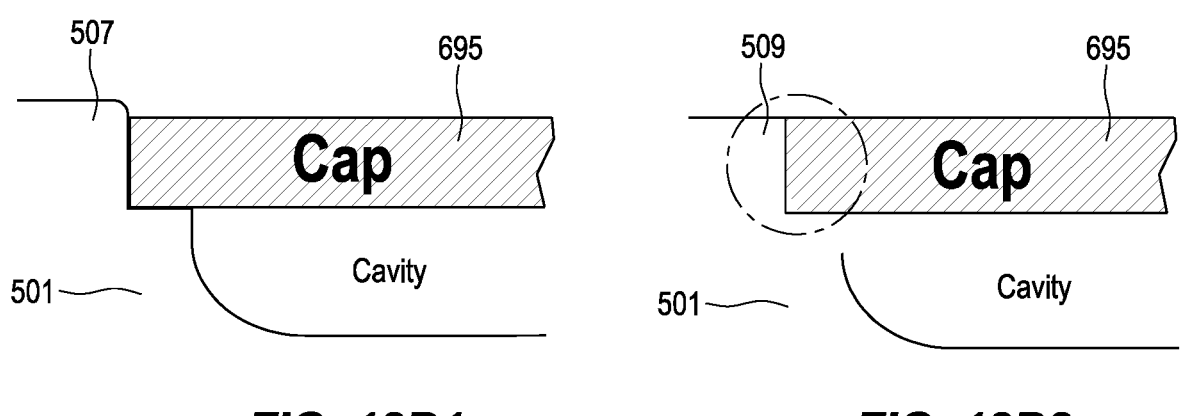
Figure 12C:
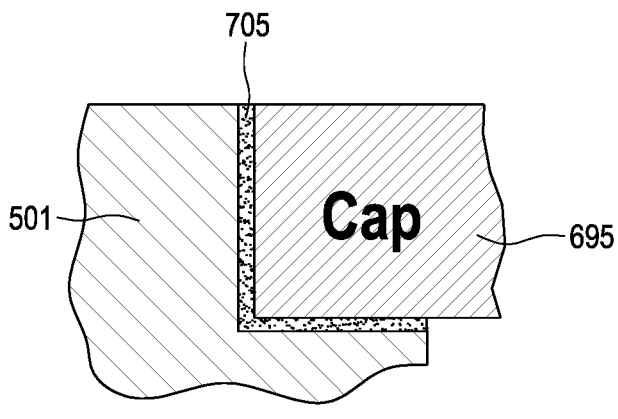

FIG. 12C an exploded cross-sectional view of a portion of the weld cap and flow substrate of FIG. 12B1, in accordance with an aspect of the present invention.

Figure 13A:
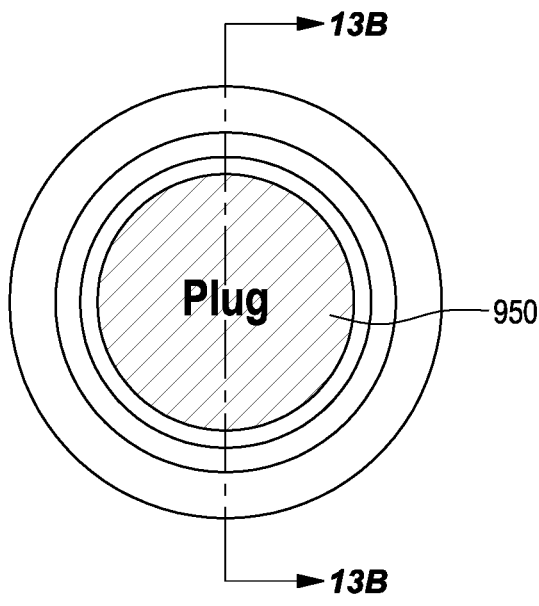

FIG. 13A is a top plan view of a plug for use with a flow substrate, in accordance with an aspect of the present invention.

Figure 13B:
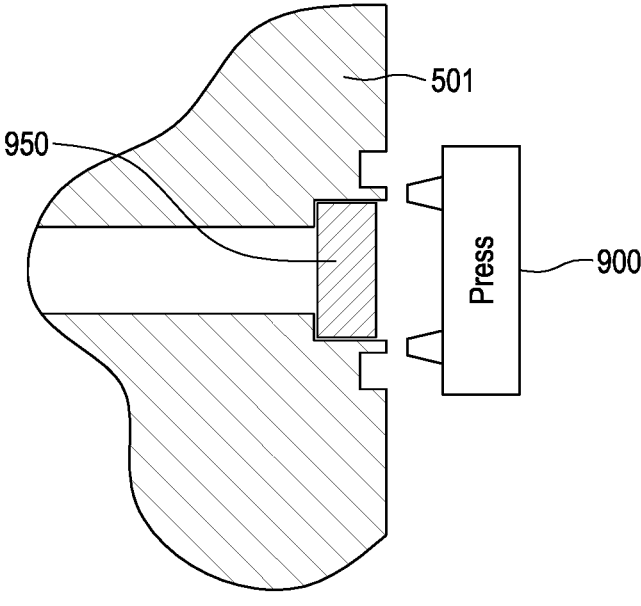

FIG. 13B is a cross-sectional view of the plug of FIG. 13A and the flow substrate, in accordance with an aspect of the present invention.

Figure 14A:
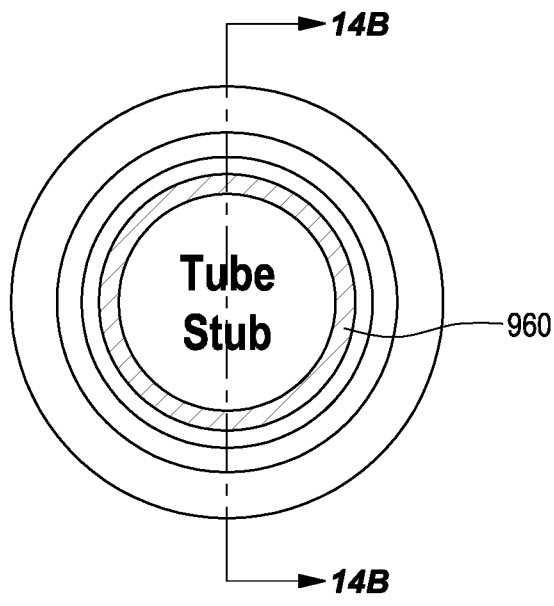

FIG. 14A is a top plan view of a tube stub for use with a flow substrate, in accordance with an aspect of the present invention.

Figure 14B:
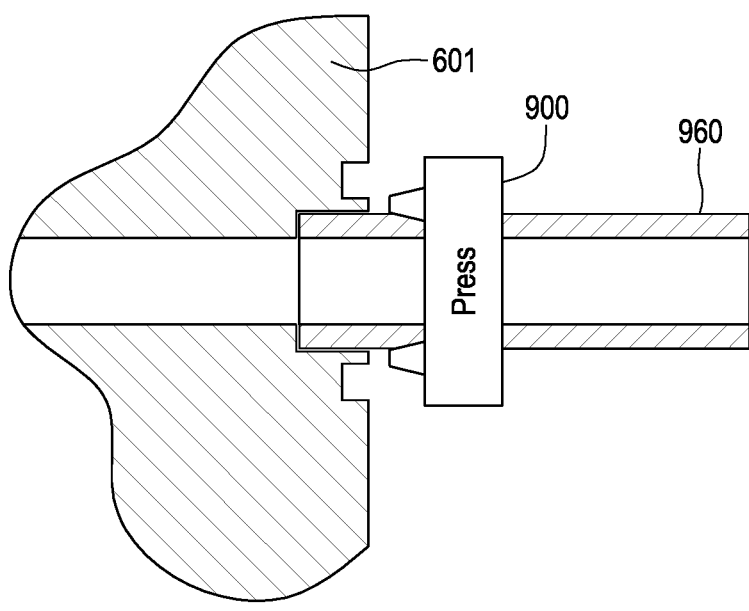

FIG. 14B is a cross-sectional view of the tube stub of FIG. 14A and the flow substrate, in accordance with an aspect of the present invention.

Figure 15:
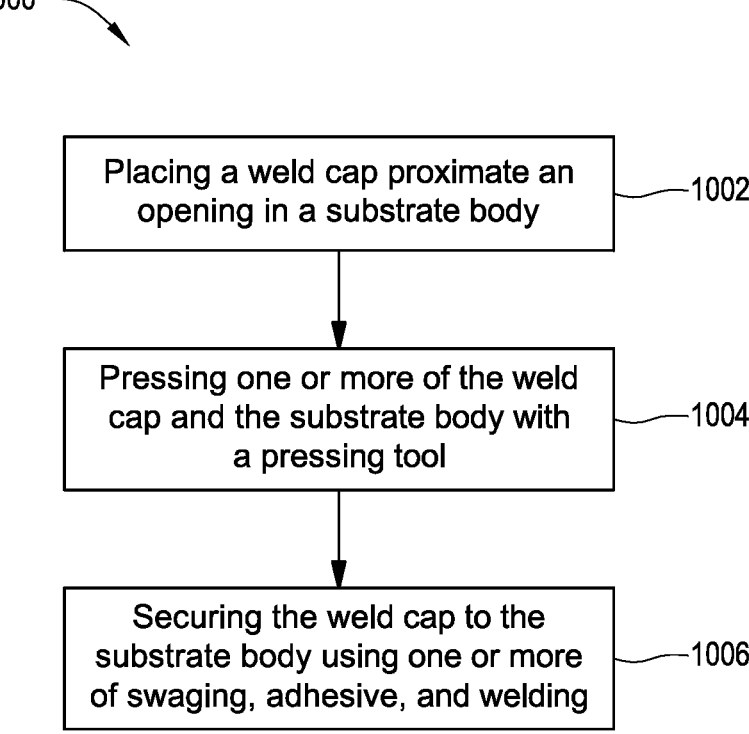

FIG. 15 is a flow chart of steps for a method of coupling a weld cap, plug, and/or tube stub with a flow substrate, in accordance with an aspect of the present invention.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items."

It should be appreciated that the fluid materials manipulated in the fluid delivery flow substrates of the present invention may be a gaseous, liquid, or vaporous substance that may change between liquid and gas phase dependent upon the specific temperature and pressure of the substance. Representative fluid substances may be a pure element such as argon (Ar), a vaporous compound such as boron trichloride (BCl3), a mixture of normally liquid silicon tetrachloride (SiCl4) in carrier gas, or an aqueous reagent.

FIGS. 1A-J illustrate a modular flow substrate in accordance with an embodiment of the present invention for use with fluid handling components having asymmetric port placement (e.g., C-seal components) in which one of the ports of the fluid handling component is axially aligned with the center of the component and the other is situated off axis. Although not shown in the figures, it should be appreciated that embodiments of the present invention may be modified for use with fluid handling components have a symmetric port placement, such as W-Seal components. See also U.S. Pat. No. 8,496,029 (the "'029 patent") which is hereby incorporated by reference as is fully set forth herein.

As shown, the flow substrate 100 includes a substrate body 101 formed from a solid block of material and an associated cap 195 (see FIG. 1I), each of which may be formed from a suitable material (such as stainless steel) in accordance with the intended use of the flow substrate. The substrate 100 includes a component attachment surface 105 to which a fluid handling component (such as a valve, pressure transducer, filter, regulator, mass flow controller, etc.) is attached. Formed in the component attachment surface 105 of the flow substrate are one or more component conduit ports 120. Component conduit port 120a would typically be fluidly connected to a first port (inlet or outlet) of a first fluid handling component, while component port 120b would typically be fluidly connected to the second port (outlet or inlet) of the first fluid handling component; component conduit port 120c would typically be fluidly connected to the port (outlet or inlet) of a second fluid handling component that is distinct form the first fluid handling component.

Component conduit ports 120c and 120d and component conduit ports 120e and 120f would each be respectively connected to the inlet and outlet of a respective fluid handling component and illustrate how the flow substrate 100 is specifically suited to fluid handling components having asymmetric port placement. Component port 120g would typically be associated with the inlet or outlet port of a device, such as a mass flow controller, that might be used to communicate the flow of process fluid between flow substrates of a fluid delivery stick.

Associated with component conduit ports 120a and 120b are a plurality of internally threaded component mounting apertures 110a, 110b, 110c, and 110d, each of which would receive the threaded end of a fastener (not shown) that is used to sealingly mount a fluid handling component to the flow substrate 100. Associated with conduit port 120g are a pair of internally threaded component mounting apertures 110y, 110z, each of which would receive the threaded end of a fastener (not shown) to sealingly mount a port of a fluid handling component, such as a mass flow controller to the flow substrate 100. It should be appreciated that an adjacent flow substrate in the fluid delivery stick would typically provide an additional pair of mounting apertures needed to sealingly mount the other port of the fluid handling component to the adjacent flow substrate. Associated with each pair of component conduit ports is a leak port 125a (for component conduit ports 120a and 120b), and 125b (for component conduit ports 120c and 120d) that permits any leakage between the conduit ports and the respective fluid handling component to be detected.

The flow substrate 100 includes a number of fluid pathways 175a, 175b, 175c, and 175d that are used to convey fluid in a longitudinal direction (i.e., from left to right in FIG. 1A) along the flow substrate 100. For example, fluid pathway 175a extends between a tube stub connection 135 and component conduit port 120a, fluid pathway 175b extends between component conduit ports 120b and 120c, fluid pathway 175c extends between component conduit port 120d and component conduit port 120e, and fluid pathway 175d extends between component conduit port 120f and 120g. Tube stub connection 135 would typically be fluidly connected (for example, by welding) to a source or sink of process fluid.

A plurality of dowel pin apertures 150a through 150h are formed in the flow substrate 100 that extend from the component attachment surface 105 through to a connection attachment surface 115 on a side of the flow substrate opposing the component attachment surface 105. The connection attachment surface 115 may be used to connect the substrate 100 to a fluid delivery stick bracket, to a manifold, or both, such as described in the '854 patent. Each of these dowel pin apertures 150a-150h can receive a dowel pin (not shown) that may be used to perform different functions. A first function is to align the cap 195 with the body 101 of the flow substrate 100, and a second is to align the flow substrate with a fluid delivery stick bracket in a manner similar to that described in the '854 patent. It should be appreciated that in certain installations, only the first of these functions may be performed, such that after alignment (and welding as described further in detail below), the dowel pin may be removed and re-used with another flow substrate body and cap. In accordance with a further aspect of the present invention, the location of the dowel pin may be backwards compatible with existing modular flow substrate systems, for example, the K1s system.

FIG. 1C illustrates a view of the flow substrate 100 from below in which a plurality of flow substrate mounting apertures 130 are visible. The plurality of flow substrate mounting apertures 130 are formed in the cap 195 and extend through the cap 195 and into the body 101 of the flow substrate (shown more clearly in FIG. 1I). Within the flow substrate body, the flow substrate mounting apertures 130 are internally threaded to receive a fastener (not shown) to mount the flow substrate 100 to a mounting surface, such as a fluid delivery stick bracket, from below. The placement of the flow substrate mounting apertures 130 may be varied depending upon the placement of mounting apertures in the mounting surface to which the flow substrate 100 is to be attached.

As can be seen in the figures, component conduit ports 120 and fluid pathways 175 are all machined in a cost-effective manner. Thus, component conduit ports 120a-120g may each be formed by machining from the component attachment surface 105 into a first or top surface of the body 101 of the flow substrate 100, fluid pathways 175b, 175c, and 175d may each be respectively formed by machining from a second or bottom surface of the body 101 of the flow substrate as shown in FIG. 1F, and fluid pathway 175a may be formed by machining from a side surface of the body of the flow substrate as shown in FIG. 1E. The fluid pathways 175 may be treated to enhance their corrosion resistance. It should be appreciated that the dimensions of the fluid pathways 175 depicted in the figures are particularly well suited for higher flow rates, such as those above approximately 50 SLM. Indeed, the dimensions of the fluid pathways depicted in the figures permit the flow substrate 100 to be used in high flow rate applications (e.g., between approximately 50-100 SLM) as well as very high flow rate applications (e.g., those above approximately 200 SLM). Thus, embodiments of the present invention may be used with emerging semiconductor manufacturing equipment that is designed to operate at very high flow rates between approximately 200 SLM to 1000 SLM. It should be appreciated that the dimensions of the fluid pathways may be scaled down for lower flow applications in a straight-forward manner, for example, simply by reducing the cross-sectional area of one or more of the fluid pathways 175b, 175c, and 175d. Indeed, because the component conduit ports 120 are formed in a different process step than the fluid pathways, the dimensions of the fluid pathways are not constrained by the dimensions of the component conduit ports, and thus, the cross-sectional area of the fluid pathways may be significantly larger, smaller, or the same as that of the component conduit ports to accommodate a wide range of flow rates.

FIGS. 1H and 1I illustrate various details of the cap 195 in accordance with an aspect of the present invention. In accordance with one embodiment that is specifically adapted for use with semiconductor process fluids that may frequently be heated to a temperature above ambient, the cap 195 is formed from a thin sheet of stainless steel approximately 0.02 inches (0.5 mm) thick. The thinness of the sheet of stainless steel permits heat to be readily transferred to the process fluids flowing in the flow substrate by application of heat to the connection attachment surface 115 of the substrate. The source of heat may be provided by a block heater, by a cartridge heater inserted into a groove of a fluid delivery stick bracket to which the flow substrate is attached in a manner similar to that described in the '854 patent, or by a thin film heater, such as that described in U.S. Pat, No.

7,307,247. It should be appreciated that the thinness of the cap also permits fluid flowing in the flow substrate to be cooled, should that be desired.

In accordance with one aspect of the present invention, the sheet of stainless steel may be chemically etched to form groves 123 that surround and define the fluid pathways 175*b*, 175*c*, and 175*d*. Such chemical etching may be accurately performed, and can be less expensive than other method of forming groves, such as by machining, which may alternatively be used. In accordance with one embodiment, the groves may be etched to a thickness of approximately 0.01 inches (0.25 mm). The presence of the grooves 123 surrounding and defining each fluid pathway 175*b*, 175*c*, and 175*d* serves a number of purposes. For example, the thinness of the grooves permits the cap to be welded to the body 101 of the flow substrate, for example, by electron beam welding, using less time and energy than if the grooves 123 were not present. The welding would be performed by tracing around each fluid pathway defined by the groove, thereby forming a fluid tight seal. The electron beam welding may be performed in a vacuum environment to minimize any contamination. Where the materials being used for the flow substrate body 101 and cap 195 are high purity metals, such as stainless steel, the vacuum welding environment acts to further eliminate contaminants (such as Carbon, Sulfur, Manganese, etc.) at the point of the weld. Although electron beam welding is generally preferred, it should be appreciated that other types of welding, such as laser welding may also be used.

The presence of the grooves 123 also serves as a guide during welding, since the grooves define the periphery of the fluid pathway. Dowel pin holes 150*a*, 150*b* in the body 101 of the flow substrate and corresponding dowel pin holes 150*a*', 150*b*' in the cap 195 receive a dowel pin that permits the cap 195 to be aligned with and held in registration with the body of the flow substrate 100 during welding. The dowel pins may be removed and re-used after welding is complete, or kept in place as an aid for aligning the flow substrate with a mounting surface.

It should be appreciated that although only four fluid pathways are illustrated in the figures, the ease and low cost of manufacturing embodiments of the present invention readily permits any number of fluid pathways and component ports to be defined in the flow substrate. In this regard, all of the fluid pathways and component connection ports for an entire fluid delivery stick may be formed in a single flow substrate. Alternatively, a fluid delivery stick may be formed by using two or more flow substrates such as the flow substrate 100 described above.

FIGS. 2A-H illustrate a modular flow substrate in accordance with another embodiment of the present invention. See also the '029 patent. Like the first embodiment, this embodiment is specifically adapted for use with fluid handling components having asymmetric port placement (e.g., C-seal components) in which one of the ports of the fluid handling component is axially aligned with the center of the component and the other is situated off axis. Although not shown in the figures, it should be appreciated that this embodiment, like the previous embodiment, may be modified for use with fluid handling components have a symmetric port placement, such as W-Seal components. This second embodiment, like the first, is specifically adapted for use in higher volume (i.e., higher flow rate) applications, but may be adapted for use in lower volume applications, such as those below approximately 50 SCCM, as well. As this second embodiment shares many similar design aspects as the first, only differences are described in detail below.

As shown, the flow substrate 400 includes a substrate body 401 formed from a solid block of material and an associated cap 495 (see FIG. 2G), each of which may be formed from a suitable material (such as stainless steel) in accordance with the intended use of the flow substrate. Primarily for cost reasons, but also for those applications that warrant the use of non-metallic materials (such as where ionic contamination is a concern), the body 401 and/or cap 495 of the flow substrate may also be formed (e.g., molded or machined) from polymeric materials, such as plastic. The use of other materials, such as plastic, permits the flow substrate 400 to be particularly well suited to chemical delivery applications or biological applications where ionic contamination is a concern, and/or applications where cost is a concern.

As in the first embodiment, flow substrate 400 includes a component attachment surface 105 to which a fluid handling component (such as a valve, pressure transducer, filter, regulator, mass flow controller, etc.) is attached. Formed in the component attachment surface 105 of the flow substrate 400 are one or more component conduit ports 120, having similar functionality as that described with respect to the first embodiment. Associated with each of the component conduit ports 120 are a plurality of internally threaded component mounting apertures 110*a*, 110*b*, 110*c*, 110*d*, 110*y*, and 110*z*, each of which would receive the threaded end of a fastener (not shown) that is used to sealingly mount a fluid handling component (not shown) to the flow substrate 400 in a manner similar to that described previously. Associated with each pair of component conduit ports is a leak port 125*a* (for component conduit ports 120*a* and 120*b*), and 125*b* (for component conduit ports 120*c* and 120*d*) that permits any leakage between the conduit ports and the respective fluid handling component to be detected.

As in the first embodiment, the flow substrate 400 includes a number of fluid pathways 175*a*, 175*b*, 175*c*, and 175*d* that are used to convey fluid in a longitudinal direction (i.e., from left to right in FIG. 2A) along the flow substrate 400. As previously described, tube stub connection 135 would typically be fluidly connected (for example, by welding, or by using a suitable adhesive, such as an epoxy) to a source or sink of process fluid.

As in the first embodiment, a plurality of dowel pin apertures 150*a* through 150*h* are formed in the flow substrate 400 that extend from the component attachment surface 105 through to a connection attachment surface 115 on a side of the flow substrate opposing the component attachment surface. The connection attachment surface 115 may be used to connect the substrate 400 to a fluid delivery stick bracket, to a manifold, or both, such as described in the '854 patent. As described previously, each of these dowel pin apertures 150*a*-150*h* can receive a dowel pin (not shown) that may be used to perform different functions. A first function is to align the cap 495 with the body 401 of the flow substrate 400, and a second is to align the flow substrate with a fluid delivery stick bracket in a manner similar to that described in the '854 patent. It should be appreciated that in certain installations, only the first of these functions may be performed. For example, depending on the length of the dowel pin used, the dowel pin may protrude through the cap 495 and extend beyond connection attachment surface 115, such that the dowel pins may be used to align the flow substrate with corresponding apertures in the fluid delivery stick bracket or other mounting surface. Where the dowel pins extend beyond the connection attachment surface 115, the locations of the dowel pins may be backwards compatible with existing modular flow substrate systems. Alternatively, the length of the dowel pin may be such that it does not extend beyond the connection attachment surface, but still engages the cap 495 to ensure alignment.

Figures 2A, 2B:
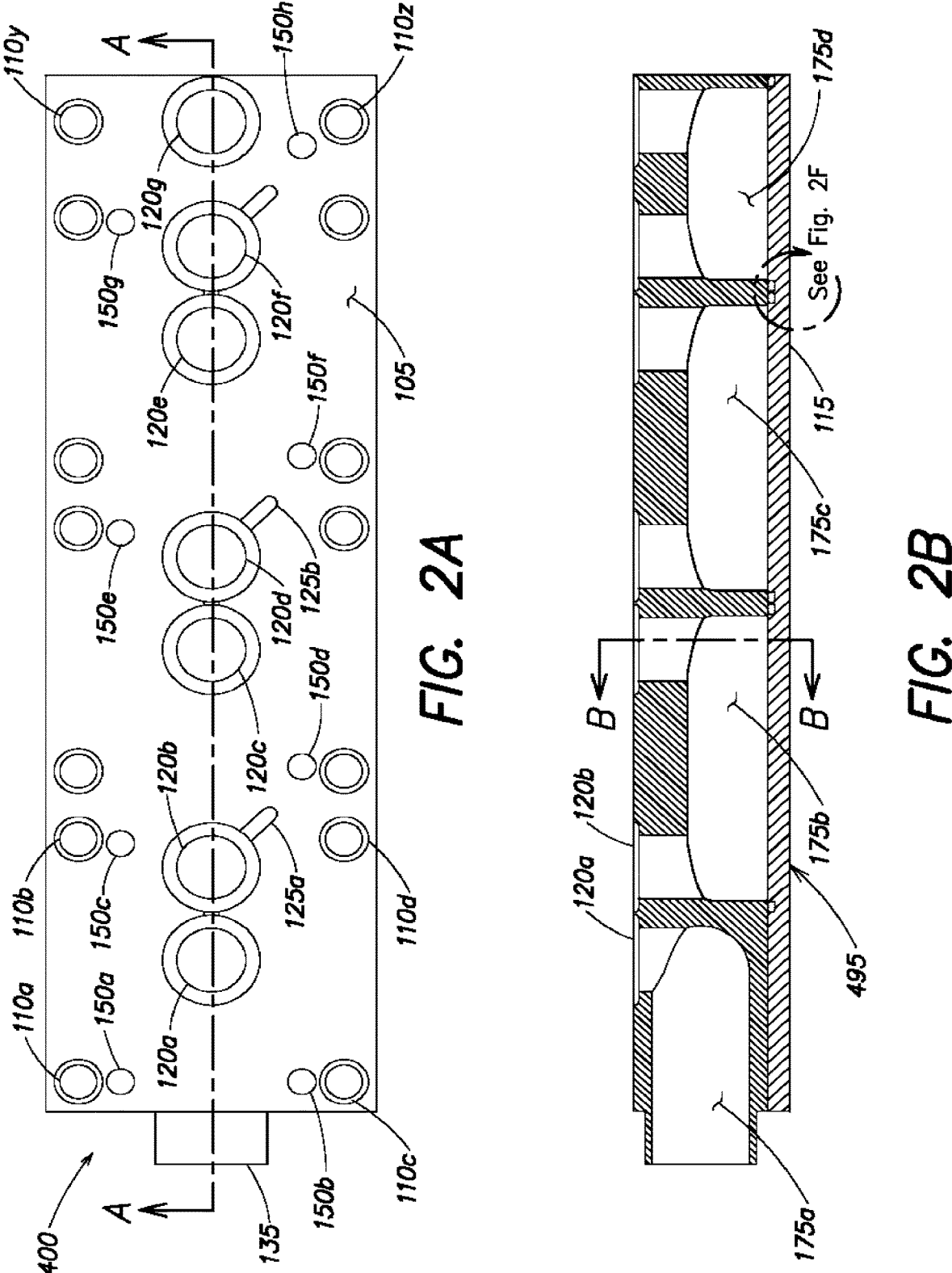
FIG. 2A is a plan view of a second embodiment of a flow substrate.
FIG. 2B is a cross-sectional view of the flow substrate of FIG. 2A taken along line A-A in FIG. 2A.
Figures 2C, 2D, 2E, 2F:
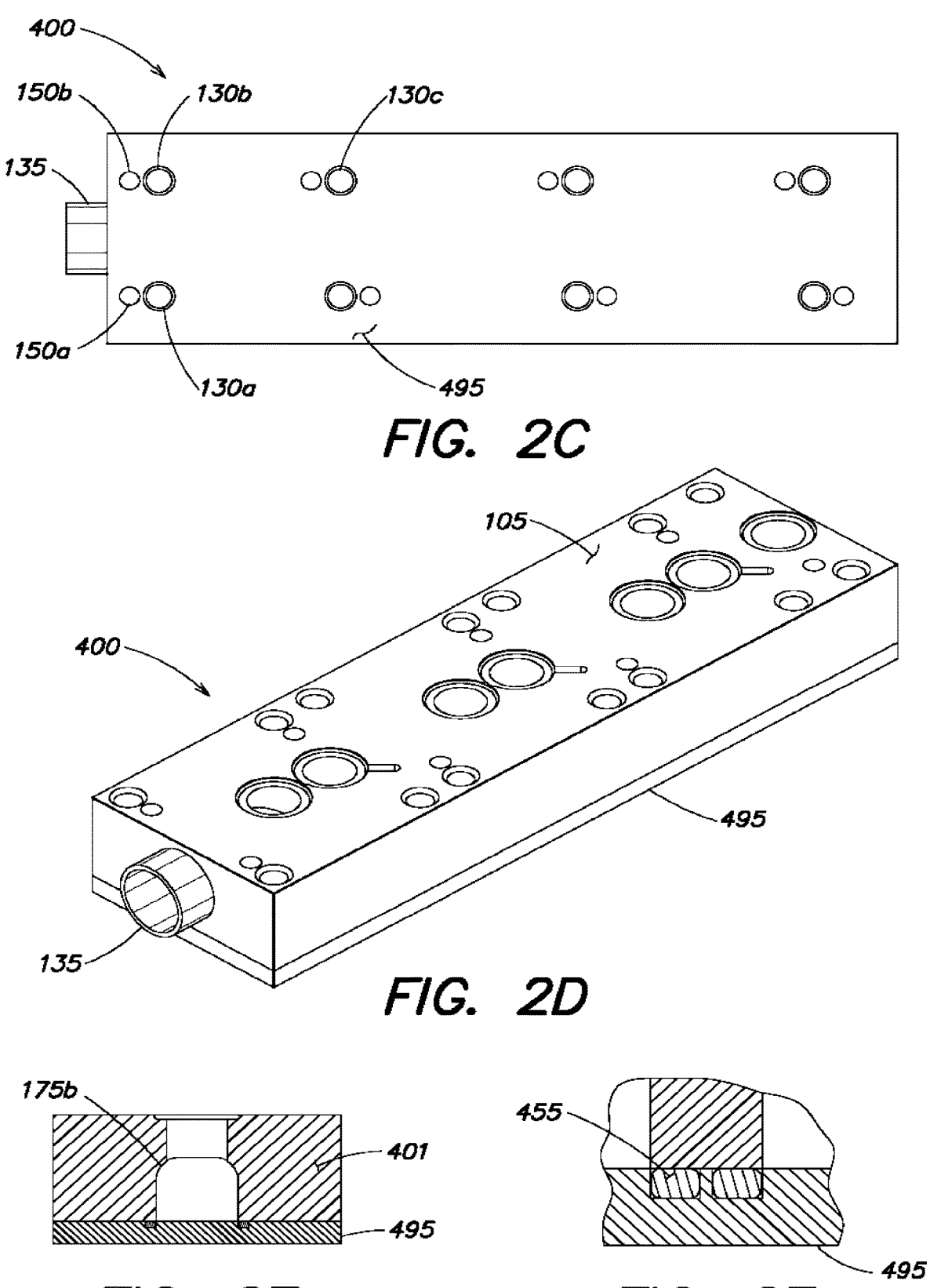
FIG. 2C illustrates a view of the flow substrate of FIGS. 2A and 2B from below.
FIG. 2D is an elevational view of the flow substrate of FIGS. 2A-C, in accordance with an aspect of the present invention.
FIG. 2E is a cross-sectional view of the flow substrate of FIG. 2B taken along line B-B in FIG. 2B.
FIG. 2F is an exploded view of a portion of the flow substrate depicted in FIG. 2B.
Figure 2G:
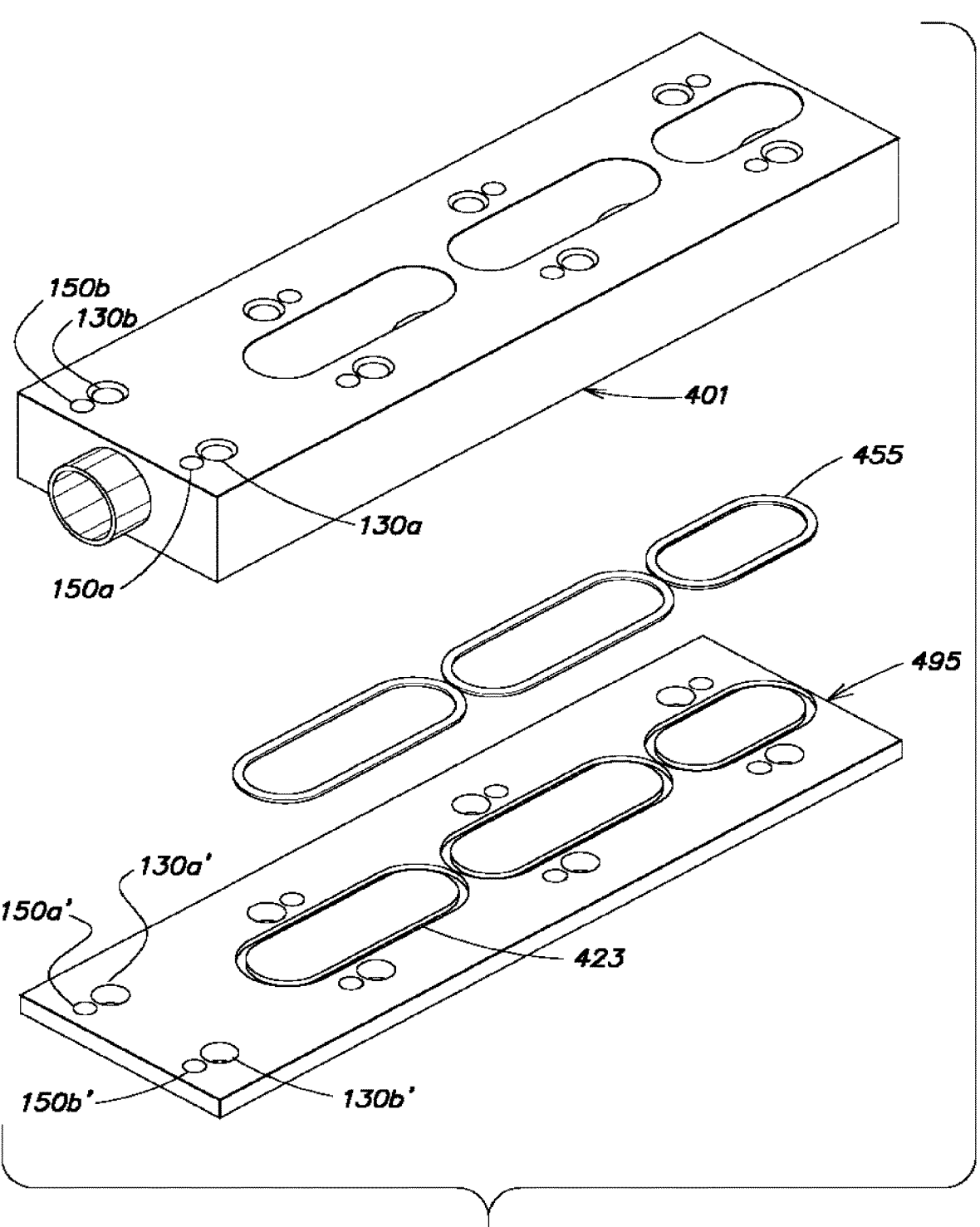
FIG. 2G illustrates various elevational views of the flow substrate of FIGS. 2A-F from below prior to assembly of the cap.

FIG. 2C illustrates a view of the flow substrate 400 from below in which a plurality of flow substrate mounting apertures 130 are visible. The plurality of flow substrate mounting apertures 130 are formed in the cap 495 and extend through the cap 195 and into the body 401 of the flow substrate (shown more clearly in FIG. 2G). Within the flow substrate body, the flow substrate mounting apertures 130 (130*a,* 130*b* in FIG. 2G) are internally threaded to receive a fastener 421 (FIG. 2H) to mount the flow substrate 400 to a mounting surface, such as a fluid delivery stick bracket, from below. The fasteners 421 are also used to compress a deformable gasket 455, such an elastomeric o-ring to form a seal around each respective fluid pathway 175*b,* 175*c,* and 175*d,* as described further below. As can be seen in the figures, component conduit ports 120 and fluid pathways 175 can again be machined or molded in a cost-effective manner.

FIGS. 2D-H illustrate various details of the cap 495 in accordance with an aspect of the present invention. As shown in FIGS. 2B and 2E, the thickness of the cap 495 is considerably thicker than that of the first embodiment (e.g., 0.13 inches (3.3 mm) versus 0.02 inches (0.5 mm)) making it somewhat less effective at transferring heat, or cooling to the fluid flowing in the flow substrate, particularly where the cap 495 and body 401 of the flow substrate 400 are formed from relatively non-conductive materials, such as plastic, and where heating (or cooling) is provided to the exposed surface 115 from below. However, the thickness of the cap 495 permits the cap 495 to be sufficiently rigid so as to permit it to act as its own mounting surface, and permits grooves 423 to be formed therein that are sufficiently deep so as to retain an elastomeric seal 455. In further contrast to the cap 195 of the first embodiment, and as shown most clearly in FIG. 2G, the grooves 423 are machined in the surface of the cap 495 that is to be placed in registration with the body 401 of the flow substrate (i.e., the unexposed surface of the cap 495 when placed in registration with the body 401 of the substrate 400, rather than the exposed surface 115 that would be placed in registration with a fluid delivery stick bracket or other mounting surface as in the first embodiment). The grooves 423 are dimensioned so as to retain the elastomeric seal 455 in place during assembly of the cap 495 to the body 401 of the flow substrate 400 without the use of additional seal retainers. During assembly and with specific reference to FIG. 2G, the elastomeric seals 455 would be positioned in the grooves 423 defined in a top surface of the cap 495, with the top surface of the cap 495 being placed in registration with the body 401 of the substrate so that dowel pin aperture 150*a'* in the cap 495 is aligned with dowel pin aperture 150*a* in the body 401, dowel pin aperture 150*b'* in the cap is aligned with dowel pin aperture 150*b* in the body 401, and substrate mounting apertures 130*a'* and 130*b'* in the cap 495 are aligned with substrate mounting apertures 130*a* and 130*b* in the body 401, respectively. Although the grooves 423 of this embodiment are described as being machined in the surface of the cap, it should be appreciated that may be formed by other processes, such as by molding.

Figure 2H:
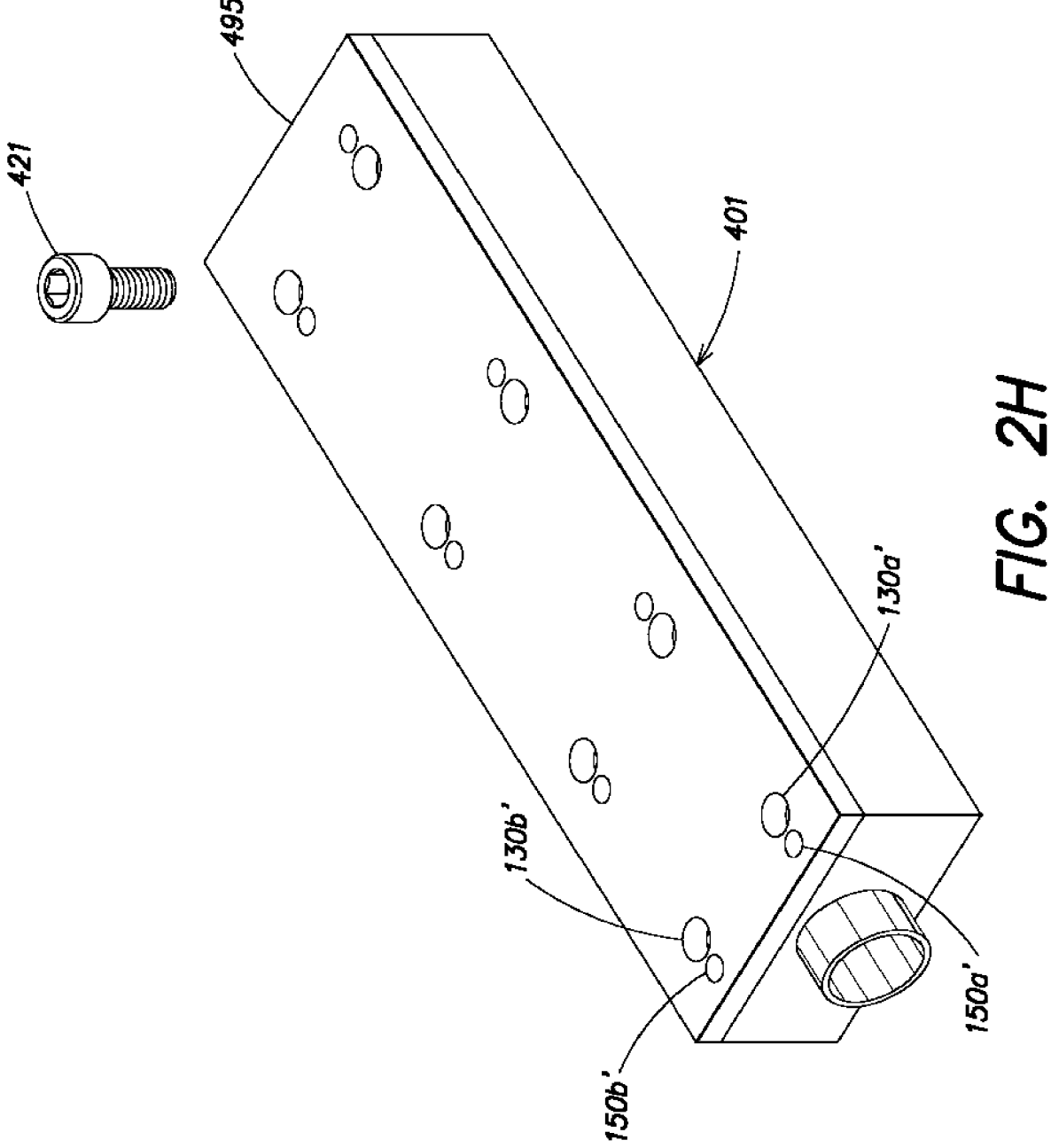
FIG. 2H illustrates an elevational view of the flow substrate of FIGS. 2A-G from below after assembly of the cap.

As can be seen in FIG. 2H, a plurality of fasteners 421 are used to secure the cap 495 to the body 401 of the flow substrate 400. These fasteners 421 may serve two purposes: to mount the flow substrate 400 to a fluid delivery stick bracket from below; and to compress the elastomeric seals 455 and ensure a fluid tight seal around the periphery of the fluid pathways 175*b-d.* In use, the elastomeric seals 455 would typically be placed in position in the grooves 423 of the cap 495. The cap would then be aligned with the body 401 of the flow substrate 400, aided by the dowel pins inserted in dowel pin apertures 150, where the dowel pins extending through dowel pin apertures 150*a',* 150*b',* etc. of the cap 495 act to secure the cap 495 and elastomeric seals 455 in place with the substrate body 401 of the flow substrate 400, thereby forming a single unit. The flow substrate 400 would then be placed in the desired position on the fluid delivery stick bracket or other mounting surface, and the fasteners 421 inserted from below the bracket or other mounting surface. Tightening of the fasteners 421 secures the flow substrate to the mounting surface, and compresses the elastomeric seals 455 so that a fluid tight seal is formed around the periphery of the fluid pathway, and the cap 495 is in registration with the body 401 of the flow substrate 400.

It should be appreciated that because the cap 495 is not welded to the body 401 of the flow substrate 400, the cap 495, and the associated elastomeric seals 455 may later be removed with a minimal amount of effort. Thus, for example, where it is desired to clean or otherwise service a fluid pathway 175*b,* 175*c,* or 175*d,* the cap 495 may be easily removed to expose and/or clean the fluid pathways, to replace one or more of the elastomeric seals 455, etc.

It should be appreciated that although only four fluid pathways are illustrated in the figures associated with this second embodiment, the ease and low cost of manufacturing embodiments of the present invention readily permits any number of fluid pathways and component ports to be defined in the flow substrate. In this regard, all of the fluid pathways and component connection ports for an entire fluid delivery stick or chemical or biological delivery system may be formed (by machining, by molding, or a combination of molding and machining) in a single flow substrate.

Although the embodiment depicted in FIGS. 2A-H may not be as effective at transferring thermal energy (heating or cooling) to the fluid flowing in the flow substrate when heated or cooled from below, it should be appreciated that this second embodiment may be modified for such use. For example, the thickness of the cap 495 may be increased so as to permit the formation of longitudinal heater apertures and the insertion of one or more cartridge type heaters therein that directly heat the cap 495, and thus the fluid flowing in the fluid pathways 175. Such a modification may be used even where the body 401 of the flow substrate is formed from a non-conductive material, such as plastic. For example, to further improve thermal conductivity, the cap 495 may be formed from a thermally conductive material, such as aluminum, while the body 401 of the flow substrate is formed from a different material, e.g., plastic.

Although not specifically illustrated, it should be appreciated that other aspects described in the '854 patent may be adapted for use with the flow substrate described herein. For example, in addition to fluid pathways oriented in a longitudinal direction, the flow substrate may include a manifold fluid pathway oriented in a transverse direction. In such an embodiment, a tube stub connection similar to the tube stub connection 135 could extend from a lateral side surface of the body 101 (401) of the flow substrate, with the manifold fluid pathway being formed in a manner similar to that described with respect to fluid pathway 175*a.*

Although embodiments of the present invention have been described primarily with respect to the use of fluid handling components having two ports, it should be appreciated that embodiment of Applicant's invention could be modified for use with a three-port component, such as a 3-port valve. However, because such fluid handling components are less common, and typically more expensive, two-port fluid handling components are generally preferred.

Figures 1A, 1B:
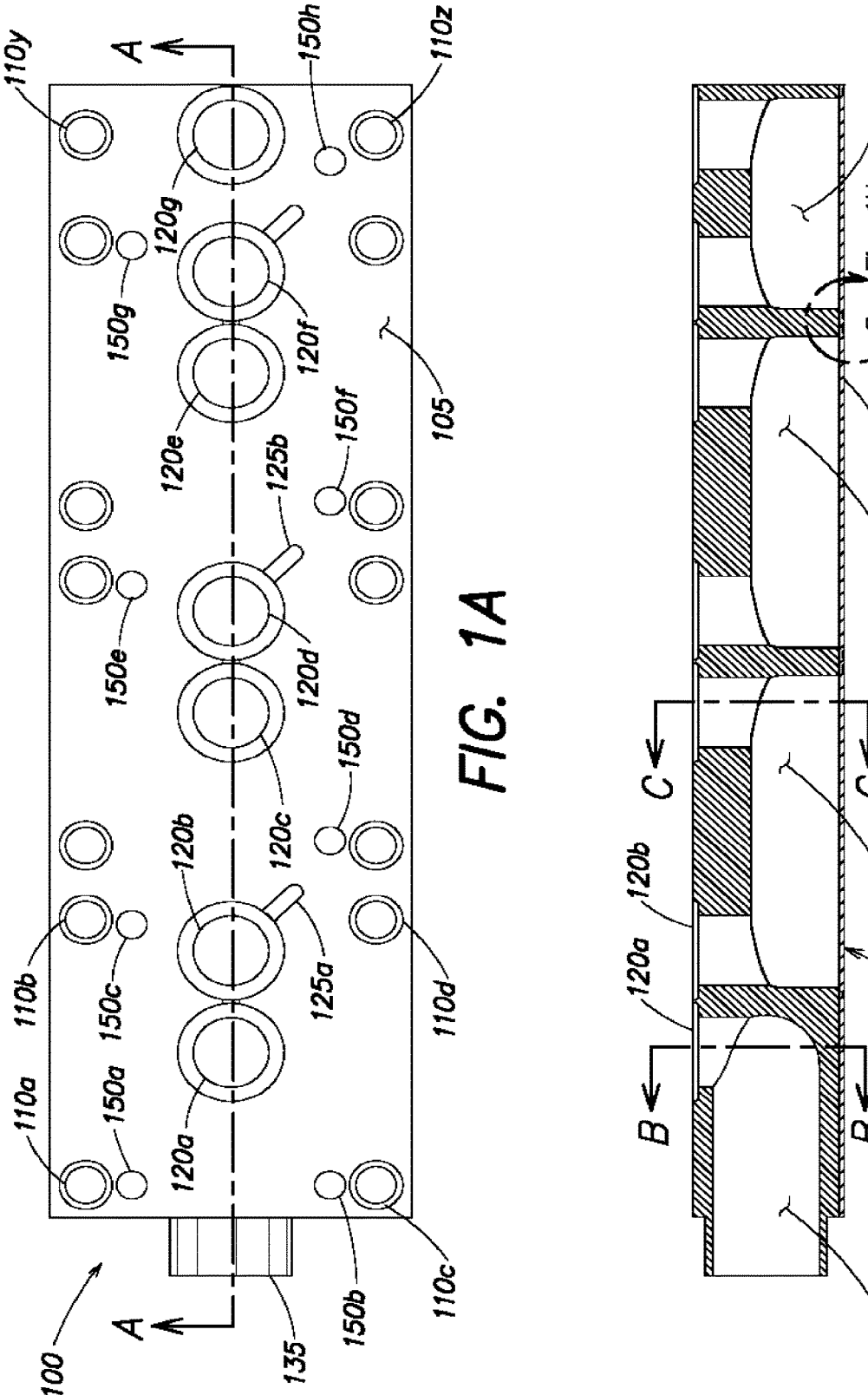
FIG. 1A is a plan view of a first embodiment of a flow substrate.
FIG. 1B is a cross-sectional view of the flow substrate of FIG. 1A taken along line A-A in FIG. 1A.
Figure 1J:
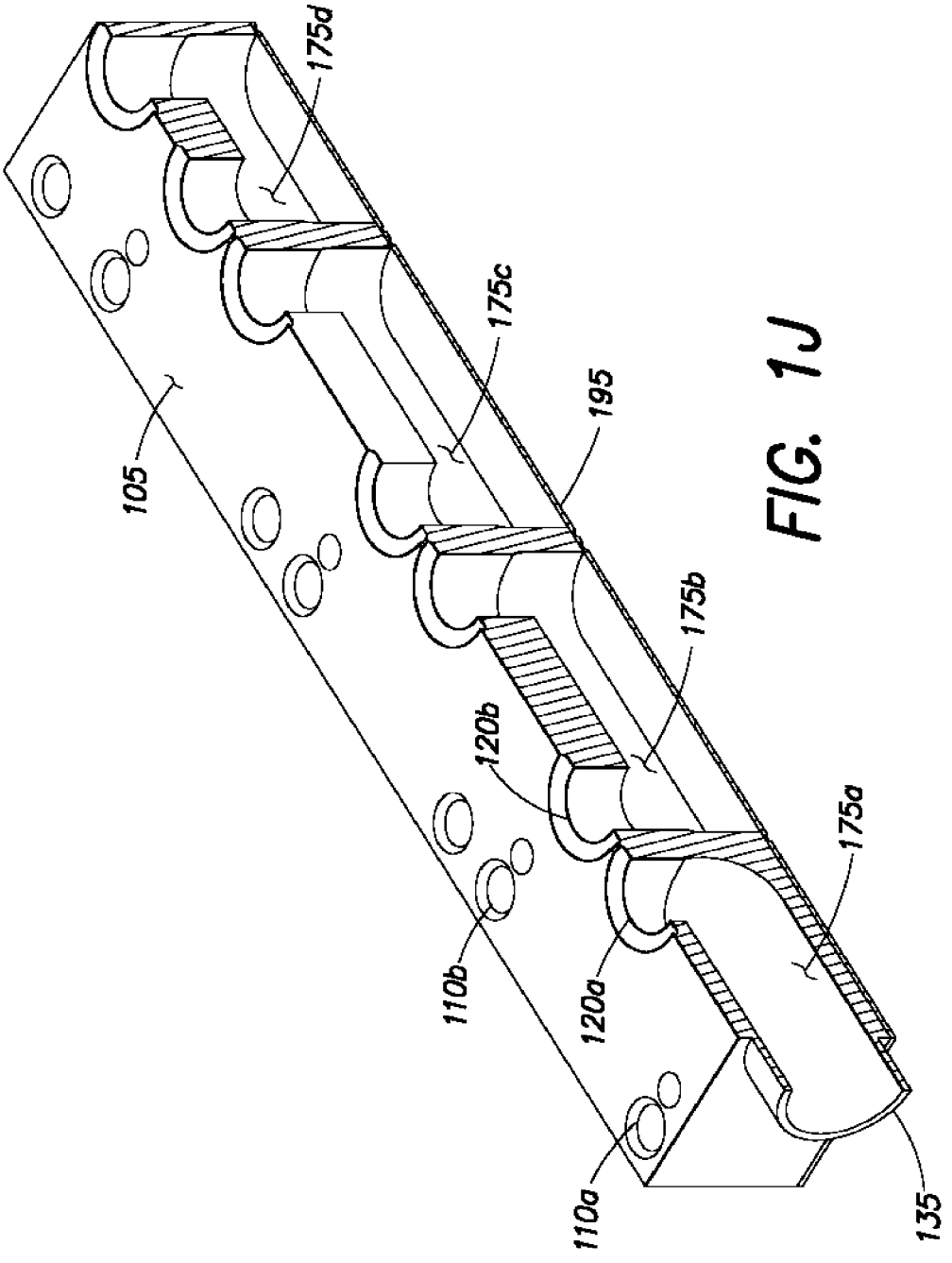
FIG. 1J is a cut-away elevational view of the flow substrate of FIGS. 1A-I.

The embodiments of FIGS. 1 and 2 described above are directed to flow substrates in which a plurality of fluid pathways formed within the substrate body are sealed by a common or integrated cap that is attached to the bottom surface of the substrate body. The embodiment of FIGS. 1A-J uses an integrated cap that is welded to the bottom surface of the flow substrate around each of the fluid pathways to seal each of the fluid pathways, while the embodiment of FIGS. 2A-H use an integrated cap that, when compressed against the bottom surface of the substrate body, compresses a plurality of elastomeric seals disposed around each of the fluid pathways to seal each of the fluid pathways. In accordance with another aspect of Applicant's invention, rather than using an integrated cap to seal each of a plurality of fluid pathways in a flow substrate as shown in FIGS. 1 and 2, a plurality of individual caps may alternatively be used. Embodiments of Applicant's invention that use a plurality of individual caps are now described with respect to FIGS. 3-12. See also the '029 patent.

Figures 3A, 3B:
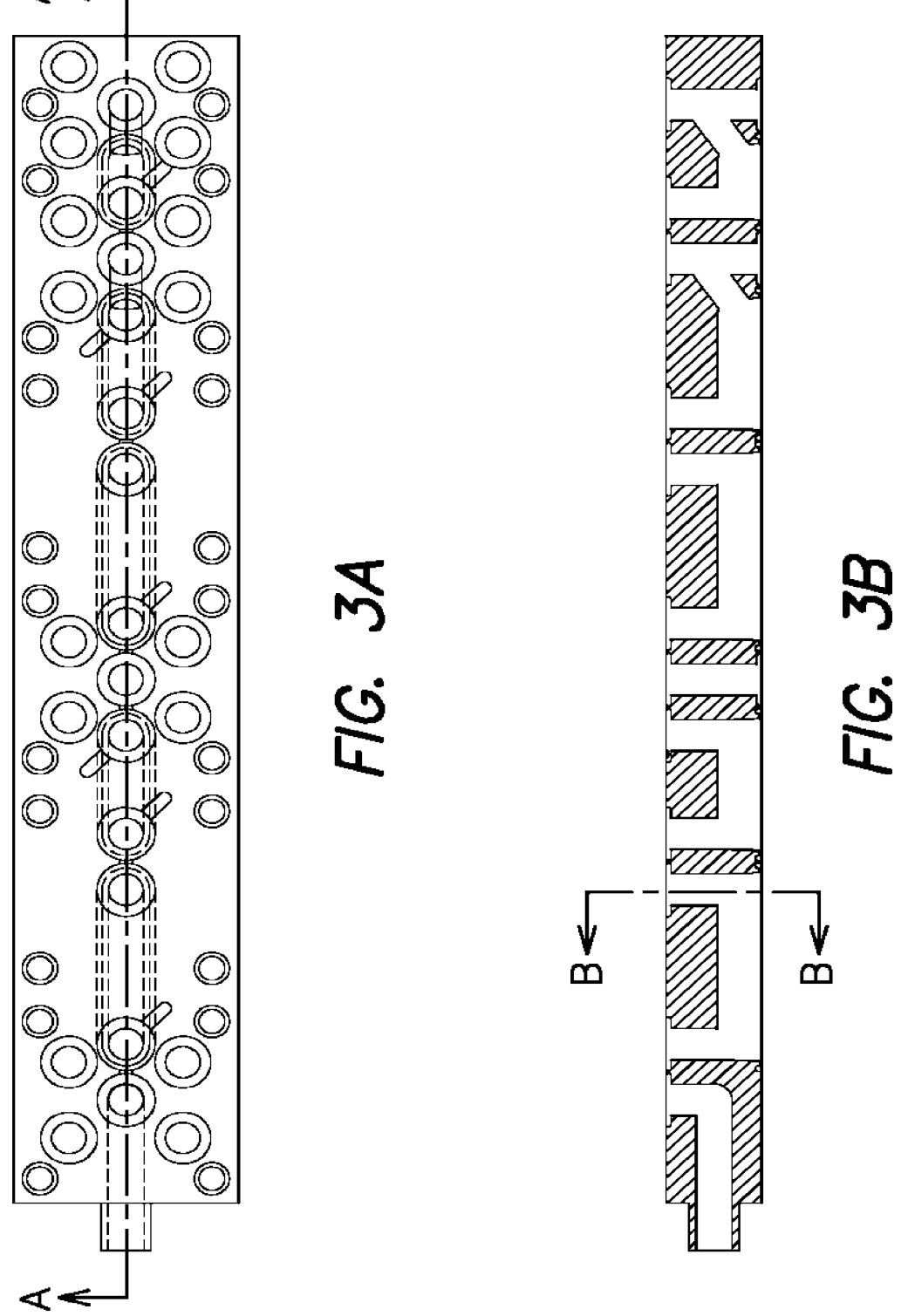
FIG. 3A is a plan view of a third embodiment of a flow substrate in accordance with the present invention.
FIG. 3B is a cross-sectional view of the flow substrate of FIG. 3A taken along line A-A in FIG. 3A.
Figure 3C:
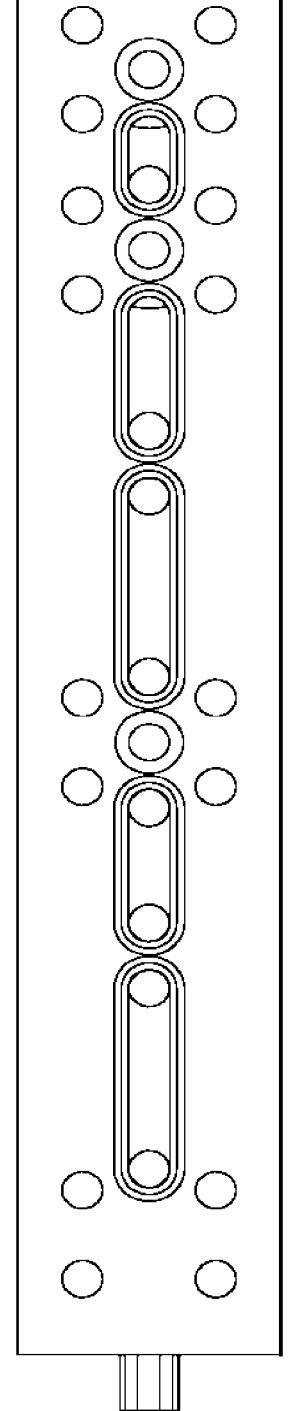
FIG. 3C illustrates a view of the flow substrate of FIGS. 3A and 3B from below.

FIGS. 3A-E are directed to a flow substrate that includes a plurality of associated caps, with each cap being associated with a respective fluid pathway formed in the body of the flow substrate. The caps may be similar in structure to the cap 595 shown in FIG. 5, and are recessed within the body of the substrate and then seam welded in place. The caps may be formed, for example, by stamping or by machining a piece of metal, for example, stainless steel. FIGS. 3A-C illustrate that in addition to being able to accommodate fluid handling components with two ports, certain embodiments of the present invention may be modified to accommodate fluid handling components having three ports.

Figure 3D:
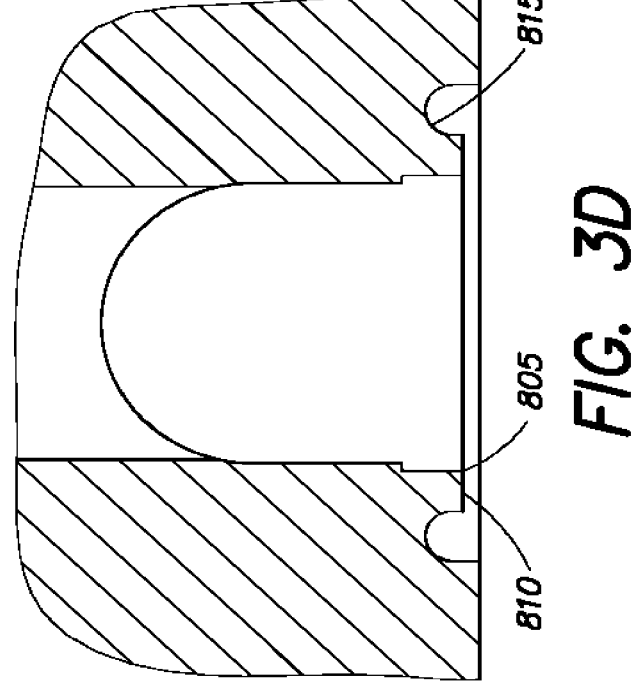
FIG. 3D is an exploded cross-sectional view of a portion of the flow substrate of FIGS. 3A-C taken along line B-B in FIG. 3B.
Figure 3E:
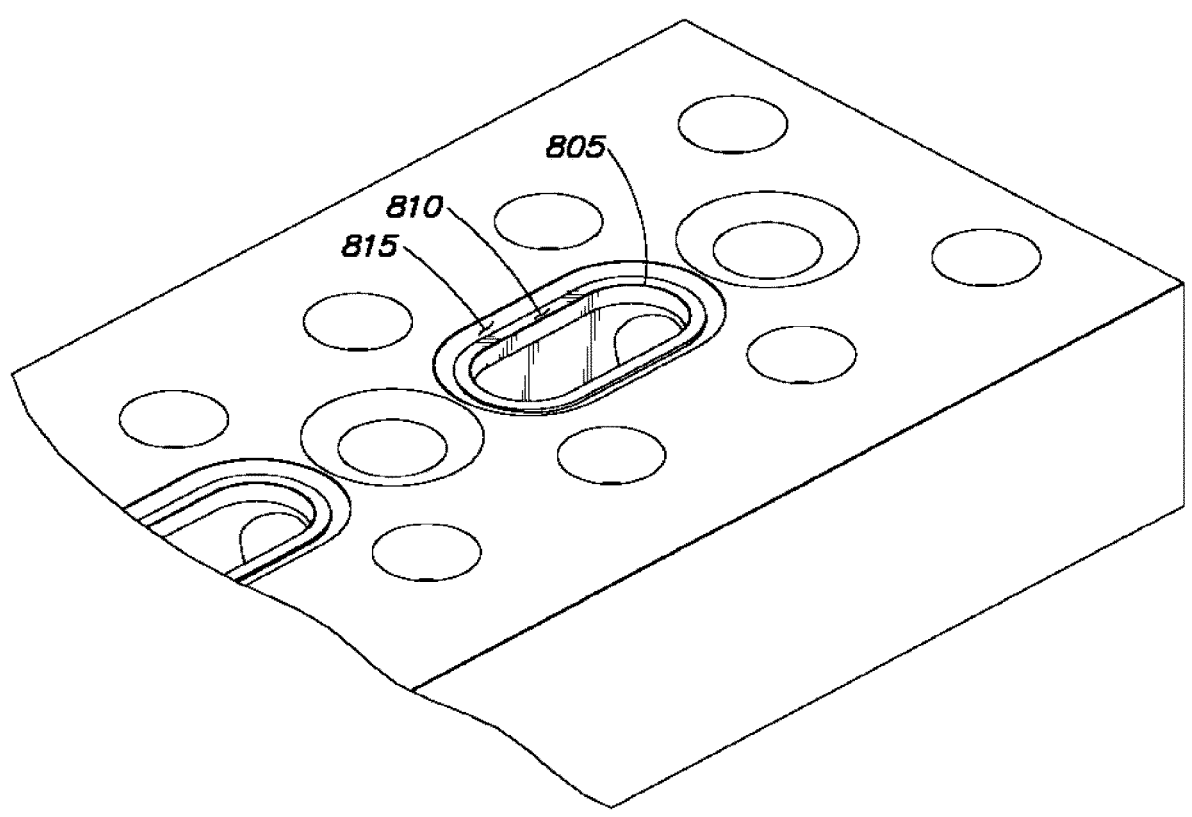
FIG. 3E is an exploded elevational view of a portion of the flow substrate of FIGS. 3A-D from below showing a first weld preparation.

As can best be seen in FIGS. 3D and 3E, each of the fluid pathways is surrounded by a weld formation (also called a weld preparation or an opening) that includes a weld edge 805, a stress relief wall 810 and a stress relief groove 815. The stress relief groove 815 acts to prevent any bowing, twisting, or other distortion that might occur during seam welding of the cap 595 to the body of the flow substrate along the weld edge 805, and the exposed surface of the weld cap 595 fits within the body of the flow substrate. Although the welding of the cap to the body of the substrate will typically leave a small bump at the weld location, no additional surface preparation is required to remove this bump because it does not extend beyond the bottom surface of the body of the flow substrate and may be left in place.

FIGS. 4A-G illustrate an alternative design of a flow substrate in accordance with the present invention that also includes a fluid pathway that is sealed by a corresponding individual cap. It should be appreciated that although FIGS. 4A-G illustrate only a single fluid pathway interconnecting two component conduit ports formed in a component attachment surface of the substrate, the substrate body may include a plurality of fluid pathways similar to those shown in FIGS. 3A-E, as FIGS. 4A-G illustrated herein are primarily used to detail the structure of the weld formation used in this particular embodiment. The cap that is used in this embodiment may be formed from a piece or sheet of metal, such as by stamping or machining, as illustrated in FIG. 5.

Figure 4A:
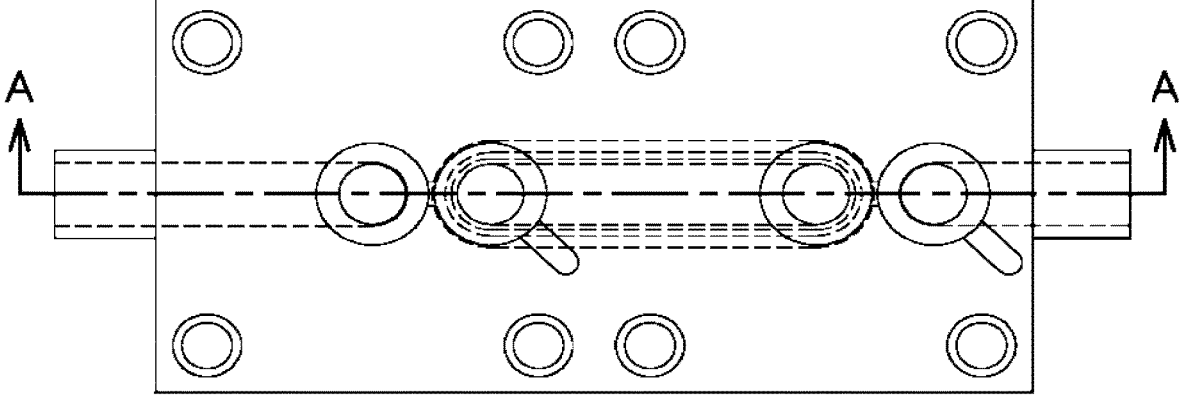
FIG. 4A is a plan view of fourth embodiment of a flow substrate.
Figure 4B:
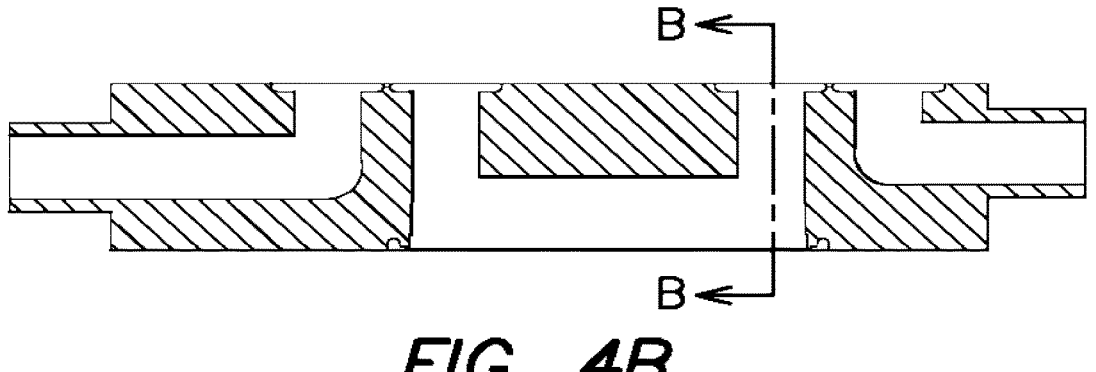
FIG. 4B is a cross-sectional view of the flow substrate of FIG. 4A taken along line A-A in FIG. 4A.
Figure 4C:
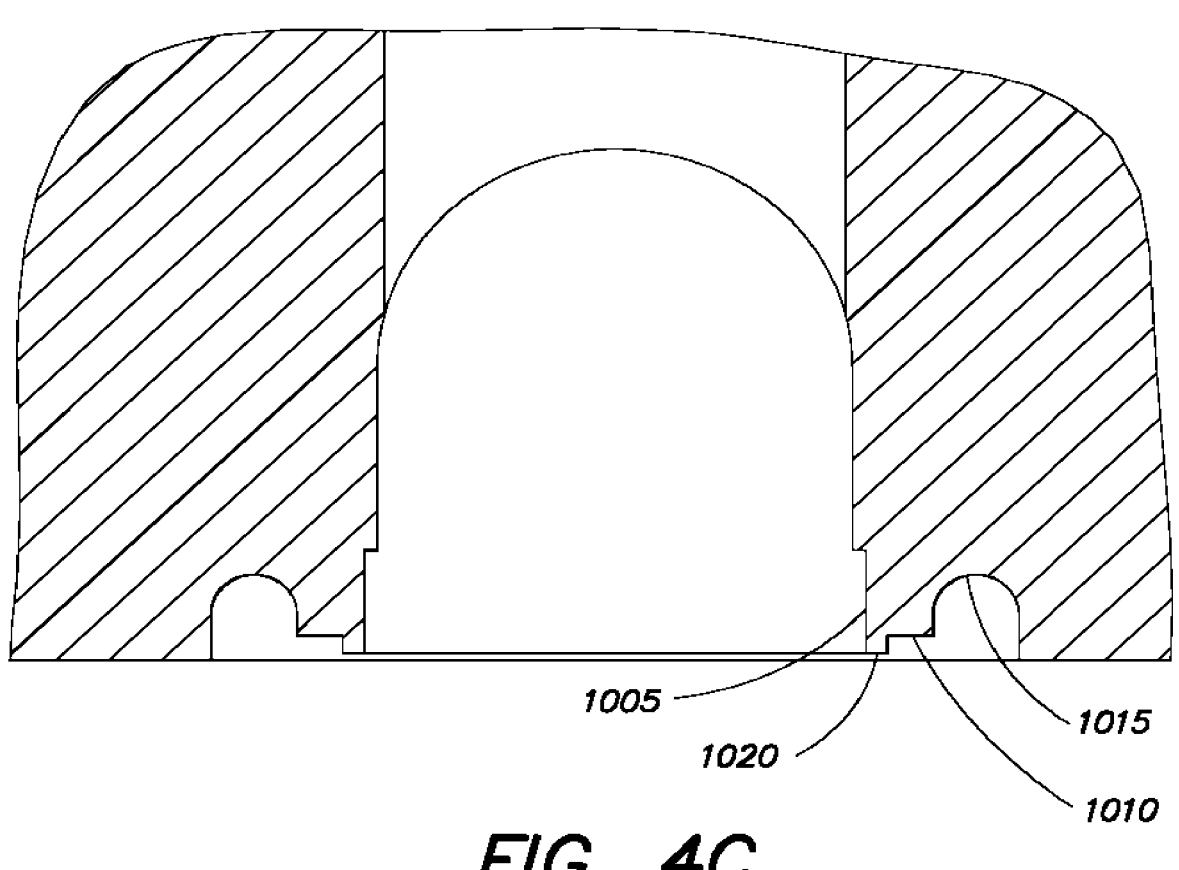
FIG. 4C is an exploded cross-sectional view of a portion of the flow substrate of FIGS. 4A-B taken along line B-B in FIG. 4B.
Figure 4D:
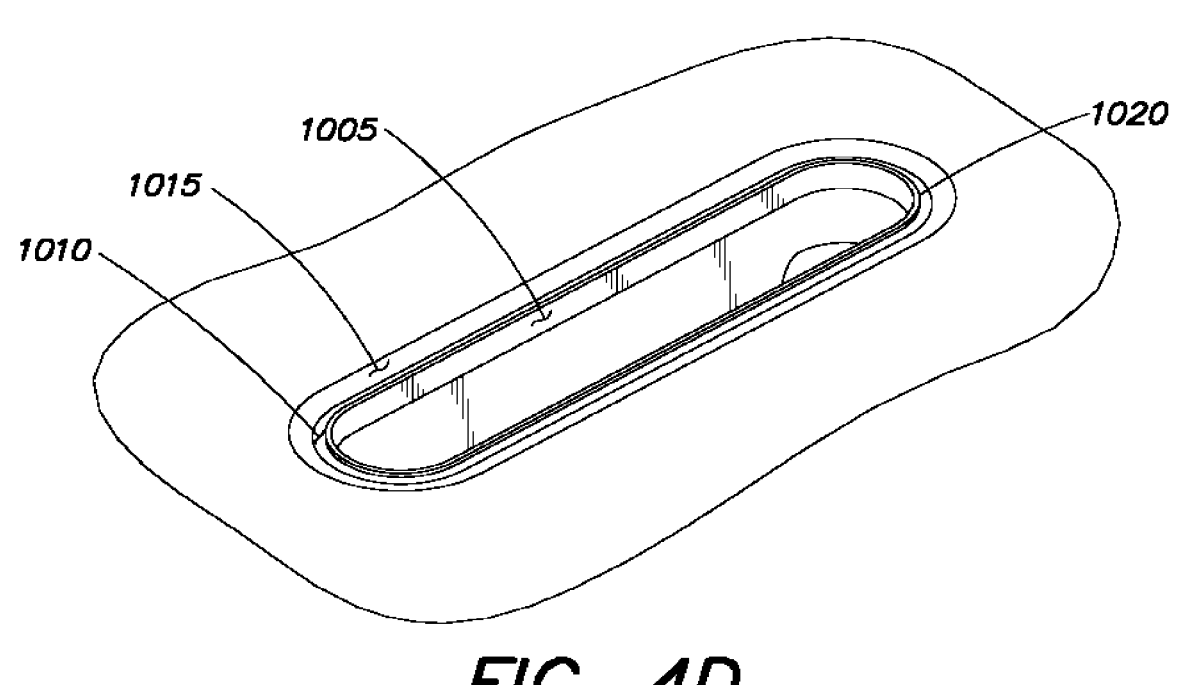
FIG. 4D is an exploded elevational view of a portion of the flow substrate of FIGS. 4A-C from below showing a second weld preparation.
Figures 4E, 4F, 4G:
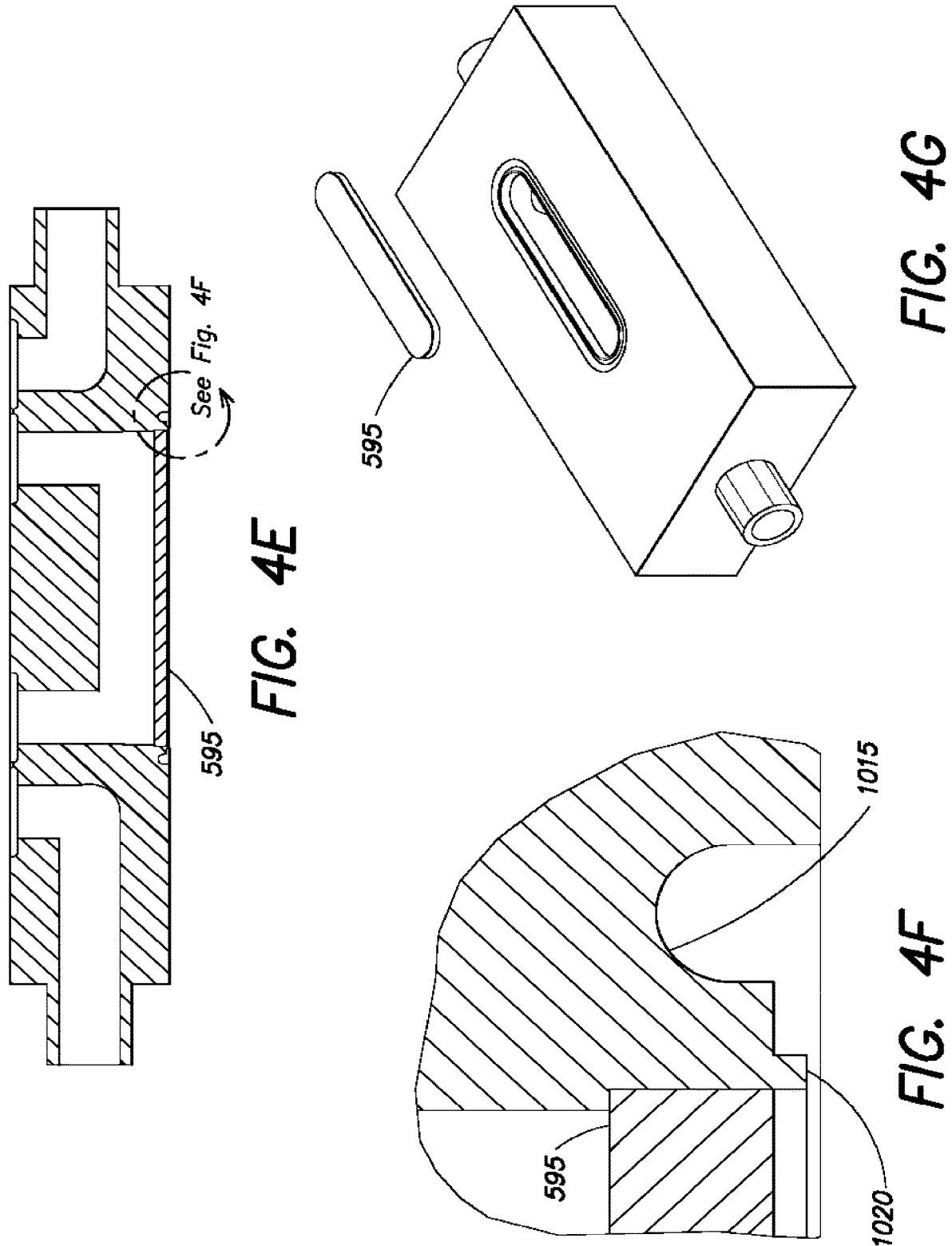
FIG. 4E is a cross-sectional view of a flow substrate of FIGS. 4A-D in which the weld cap is shown in position.
FIG. 4F is an exploded cross-sectional view of a portion of the flow substrate of FIG. 4E.
FIG. 4G is an elevational view of the flow substrate of FIGS. 4A-F from below.

As best illustrated in FIG. 4C, the weld formation includes a weld edge 1005, a stress relief wall 1010 and a stress relief groove 1015, each performing a function similar to that described above with respect to FIGS. 3A-E. However, in contrast to the embodiment of FIGS. 3A-E, the embodiment depicted in FIGS. 4A-G also includes a weld cap lip 1020. During manufacture, after placing a respective cap 595 (FIG. 5) in each of the fluid pathways to be sealed, a mechanical force would be applied to the weld cap lip 1020 surrounding each fluid pathway, for example, using a die or jig built for this purpose. The mechanical force applied to the die or jig (i.e., press) pushes or folds (i.e., swages) the lip inward toward the weld edge to capture and retain the respective cap 595 within the body of the flow substrate (i.e., creates a swaged joint). The substrate with its associated retained cap(s) may then be manipulated as a single unit. Each respective cap may then be seam welded along the folded weld cap lip and weld edge to form a leak tight seal. As in the embodiment of FIGS. 3A-E, no additional surface preparation or machining is required to remove any weld bump that might be formed along the weld edge, because it does not extend beyond the bottom surface of the substrate body. As in the previous embodiment of FIGS. 3A-E, the stress relief groove acts to prevent any bowing, twisting, or other distortion that might occur during seam welding of the cap 595 to the body of the flow substrate along the weld edge 1005.

Figure 5:
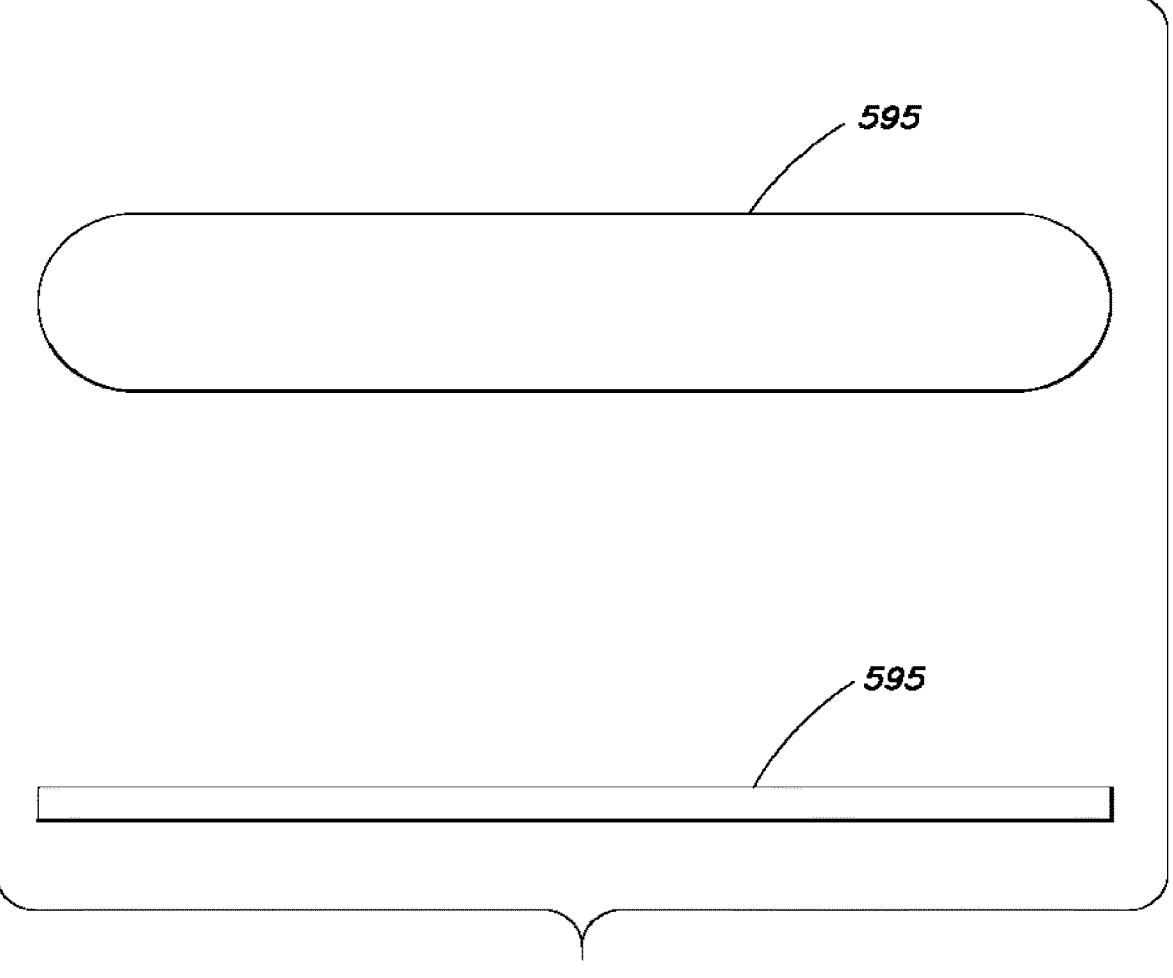
FIG. 5 illustrates various views of a weld cap for use with the flow substrates of FIGS. 3-4.
Figure 6A:
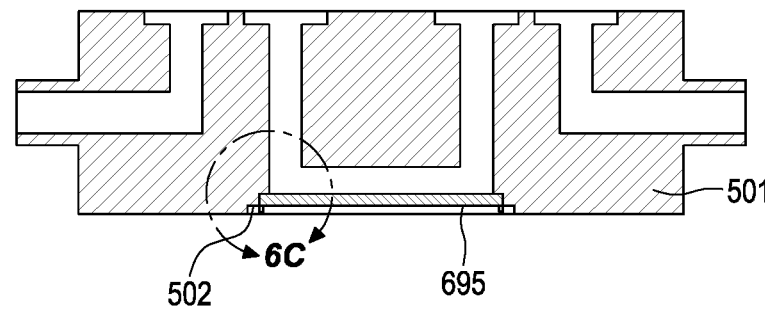
FIG. 6A is a cross-sectional view of an embodiment of the flow substrate, in accordance with an aspect of the present invention.
Figure 6B:
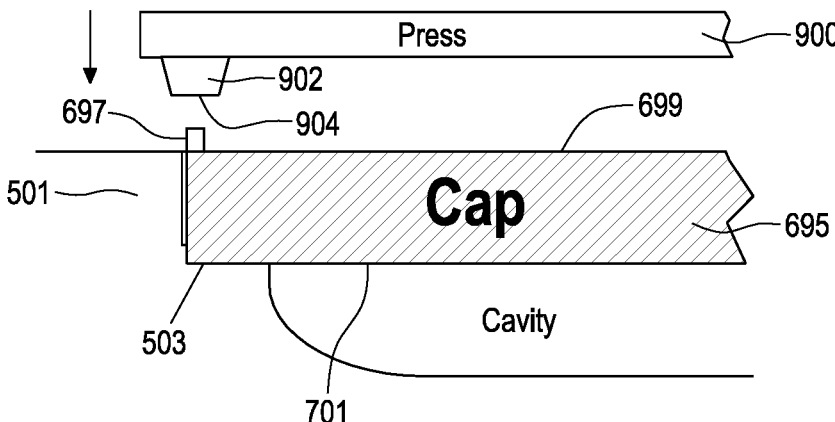
FIG. 6B is an exploded cross-sectional view of a portion of the flow substrate of FIG. 6A with a press in a first position, in accordance with an aspect of the present invention.
Figure 6C:
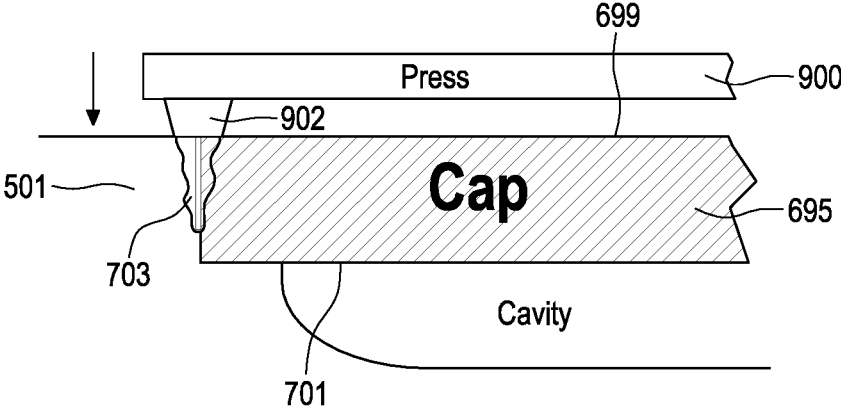
FIG. 6C is the exploded cross-sectional view of the portion of the flow substrate of FIG. 6B with the press in a second position, in accordance with an aspect of the present invention.

FIG. 5 illustrates a cap 595 that may be used with the embodiments of FIGS. 3-4. Advantageously, the cap 595 may be machined, molded, casted, forged or stamped from a sheet of metal at very low cost. The thickness of the cap 595 in one embodiment of the present invention is approximately 0.035 inches (0.9 mm) thick, nearly twice the thickness of the integrated weld cap 195, and requires no additional reinforcement even in high pressure applications. The thickness of the weld cap can vary depending on the material used and the weld process. It is beneficial to select a thickness and material that will allow a full penetration weld between the weld cap and the substrate body to eliminate any voids/gaps (e.g., fill any voids/gaps) to minimize/eliminate any entrapment areas for leaked material from the system FIGS. 6A-C illustrate yet another alternative design of a flow substrate in accordance with the present invention that includes a fluid pathway sealed by a corresponding individual cap. As in the embodiment of FIGS. 3A-E, it should be appreciated that a substrate body 501 may include a plurality of fluid pathways similar to those shown in FIG. 3A. However, FIGS. 6A-C illustrated herein primarily illustrate the details of the structure of the weld cap formation used in this particular embodiment. A weld cap 695 shown in this embodiment may be similar to the weld cap 595 that is described with respect to FIG. 5 above, and may be formed from a piece or sheet of metal, such as by stamping or machining, as illustrated in FIG. 5. The weld cap 695 can, however, have a different profile that allows for different joining options with the substrate body 501. The weld cap 695 can include a weld cap lip 697 (i.e. a raised lip) and the substrate body 501 can include a recessed flat bottom 502 and a recessed weld cap bottom 503. The recessed flat bottom 502 can be adjacent the opening in the substrate body (and adjacent the weld cap 695 when the weld cap is coupled with the substrate body 501). The recessed flat bottom 502 can be part of a stress relief groove or other similar feature to help prevent deformation of the substrate body during welding.

The weld cap 695 can comprise a first surface 699 (i.e., first cap surface; first weld cap surface) and a second surface 701 (i.e., second cap surface; second weld cap surface). The weld cap 695 can be coupled with the opening of the substrate body 501 where the second cap surface 701 fits with the recessed weld cap bottom 503. During coupling of the weld cap 695 with the opening of the substrate body 501, a press 900 can be used to press the weld cap lip 697 and deform the weld cap lip 697 and fill any gap (i.e., void) between the substrate body 501 and the weld cap 695 and create a swaged joint 703. Using the swaged joint described herein is beneficial for minimizing and/or eliminating gaps between the weld cap 695 and the substrate body 501. Any gaps between the weld cap 695 and the substrate body 501 can create voids between 501 and 695 which can create entrapment areas for leaked material from the system. After coupling, the first surface 699 of the weld cap 695 becomes an outside surface of the coupled weld cap and body 501; first surface 699 is shown as the bottom surface in FIG. 6A and top surface in FIGS. 6B-6C.

After pressing, the deformed weld cap lip 697 fills the gap and the weld cap 695 can be welded in place with a weld process appropriate to the industry and requirements needed. Exemplary weld processes include, but are not limited to, electron beam welding, laser welding, TIG welding, MIG welding, and other appropriate welding techniques. A benefit of this design is that the weld cap can include the necessary features (e.g., the weld cap lip) for securing the weld cap to the substrate body which can: (i.) alleviate the need for machining the features on the substrate body; and (ii.) result in a lower cost for the overall assembly (e.g., substrate body+weld cap).

FIG. 6A shows the weld cap 695 coupled with the substrate body 501. FIG. 6B is a partial cross-sectional view of the weld cap 695 with the press 902 positioned adjacent the weld cap lip 697 of the weld cap 695 and a gap FIG. 6C is a partial cross-sectional view of the weld cap 695 after the press 900 has contacted the weld cap lip 697 and deformed the material of the weld cap lip 697 to fill the gap between the weld cap 695 and the substrate body 501.

The press 900 can include a pressing feature 902 with a pressing surface 904 that planar and the pressing surface 904 can contact the weld cap lip 697 and deform the weld cap lip 697 to fill the gap between the weld cap 695 and the substrate body. The pressing feature 902 can be shaped to guide (i.e., force, direct, move, etc.) material from the weld cap 695 and/or the substrate body 501 to form the swaged joint 703 between the weld cap 695 and the substrate body 501.

Figure 7A:
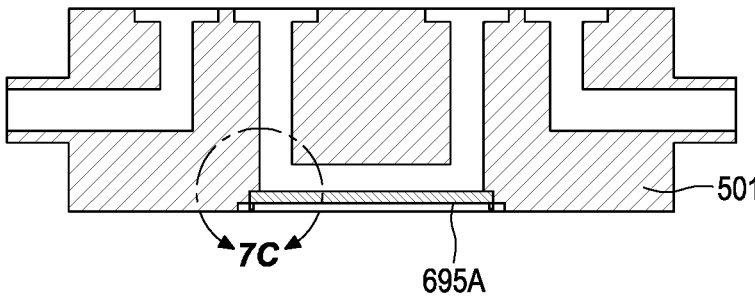
FIG. 7A is a cross-sectional view of another embodiment of a flow substrate, in accordance with an aspect of the present invention.
Figure 7B:
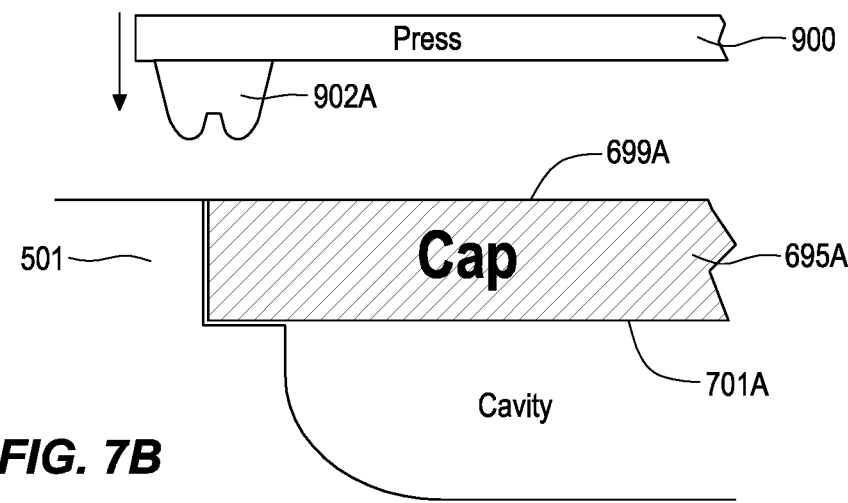
FIG. 7B is an exploded cross-sectional view of a portion of the flow substrate of FIG. 7A with a press in a first position, in accordance with an aspect of the present invention.
Figure 7C:
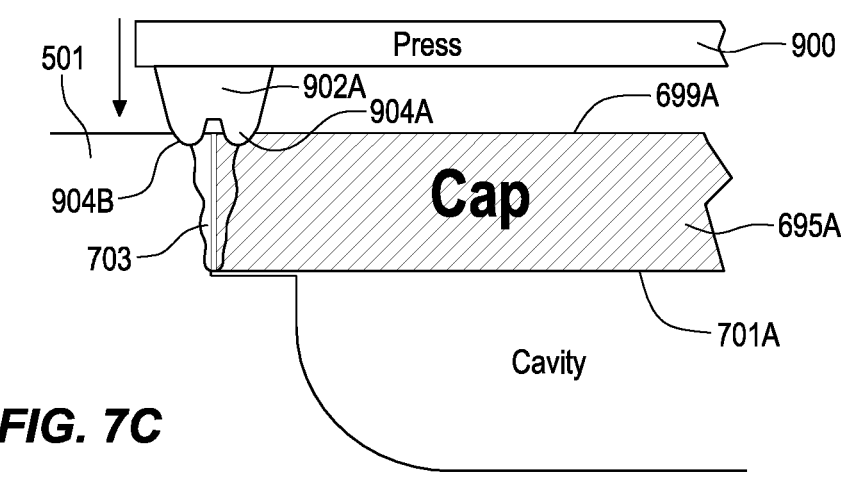
FIG. 7C is the exploded cross-sectional view of the portion of the flow substrate of FIG. 7B with the press in a second position, in accordance with an aspect of the present invention.

FIGS. 7A-C show another embodiment of a weld cap similar to what was described above and shown in FIGS. 6A-C but with another variation on securing the weld cap to the substrate body. FIG. 7A is a cross-sectional view of a substrate body 501 with a weld cap 695A. The weld cap 695A can be coupled with the opening of the substrate body 501 where the second cap surface 701A matches up with the recessed weld cap bottom. The weld cap 695A can be in the same plane as the substrate body 501 (e.g., the first weld cap surface 699A can be planar with the adjacent surface of the substrate body 501). A press 900 can include a pressing feature 902A capable of pushing together material from where the weld cap 695A and the substrate body 501 meet to close the gap.

The pressing feature 902A can comprise a pressing surface with two contact points 904A and 904B (e.g., two peaks separated by a valley). One of the two contact points 904A can contact the weld cap 695A and the other of the two contact points 904B can contact the substrate body 501 adjacent the weld cap 695A. The press 900 can be used to press the weld cap edge and the substrate body edge and deform the weld cap edge and the substrate body edge and fill the gap between the substrate body 501 and the weld cap 695A and create a swaged joint 703. After pressing, the deformed weld cap edge fills the gap and the weld cap 695A can be welded in place with a weld process as described herein.

In some embodiments the press 900 can also include a spring and/or be spring-loaded with a preset or adjustable pressure to hold the weld cap 695A in place prior to and during movement of the press. This can help prevent unwanted movement of the weld cap 695A before the weld cap 695A is pressed in place into the substrate body 501. Any of the embodiments described herein can include a press with a spring and/or be spring loaded to prevent and/or limit movement of the weld cap.

A benefit of the embodiment of FIGS. 7A-7C is that neither the weld cap 695A nor the substrate body 501 have additional features (e.g., the weld cap lip 697 discussed above and shown in FIGS. 6B-C and/or the substrate body lip 505 shown in FIGS. 8B-C) that require additional cost to create (e.g., time/money for machining the weld cap lip 697 and/or the substrate body lip 505).

Figure 8A:
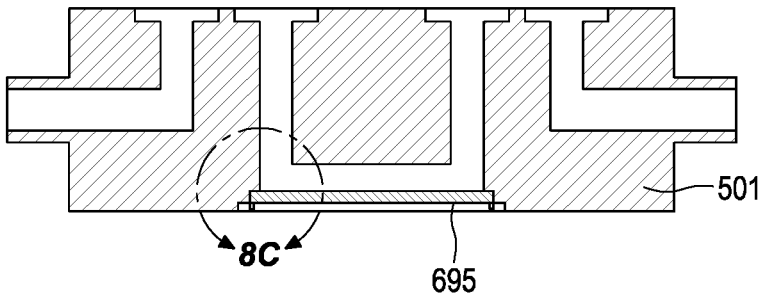
FIG. 8A is a cross-sectional view of another embodiment of a flow substrate, in accordance with an aspect of the present invention.
Figure 8B:
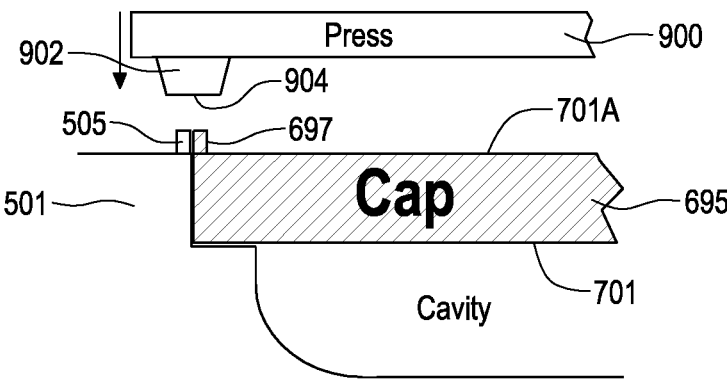
FIG. 8B is an exploded cross-sectional view of a portion of the flow substrate of FIG. 8A with a press in a first position, in accordance with an aspect of the present invention.
Figure 8C:
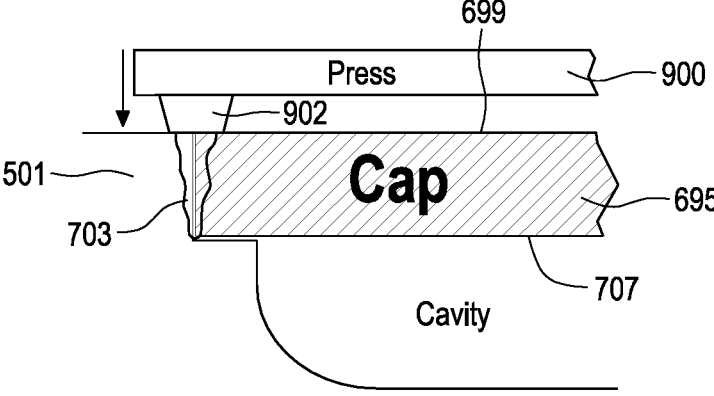
FIG. 8C is the exploded cross-sectional view of the portion of the flow substrate of FIG. 8B with the press in a second position, in accordance with an aspect of the present invention.

FIGS. 8A-C are yet another embodiment of a weld cap and a substrate body. FIG. 8A is a cross-sectional view of a substrate body 501 and the weld cap 695. The weld cap 695 can have a weld cap lip 697 and the substrate body 501 can have a substrate body lip 505. When the weld cap 695 is coupled with the substrate body 501, the weld cap lip 697 and the substrate body lip 505 can be proximate to one another.

A press 900 can have a pressing element 902 with a pressing surface 904 that is substantially flat. The pressing surface 904 can contact and deform the weld cap lip 697 and the substrate body lip 505 and fill the gap between the weld cap 695 and the substrate body 501 and create a swaged joint 703. After pressing, the deformed weld cap 695 can be welded in place with a weld process as described herein.

The embodiment shown in FIGS. 8A-C can be beneficial for closing larger gaps between the substrate body and the weld cap because it has two weld cap lips (e.g., the weld cap lip 697 and the substrate body lip 505) which provide additional material (compared to embodiments that do not include weld cap lips and/or substrate body lips) for filling in the gap.

Figure 9A:
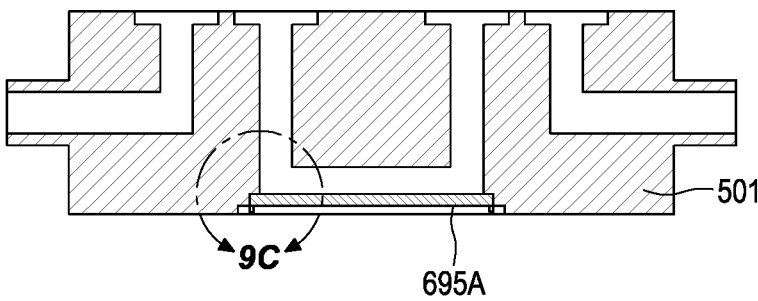
FIG. 9A is a cross-sectional view of another embodiment of a flow substrate, in accordance with an aspect of the present invention.
Figure 9B:
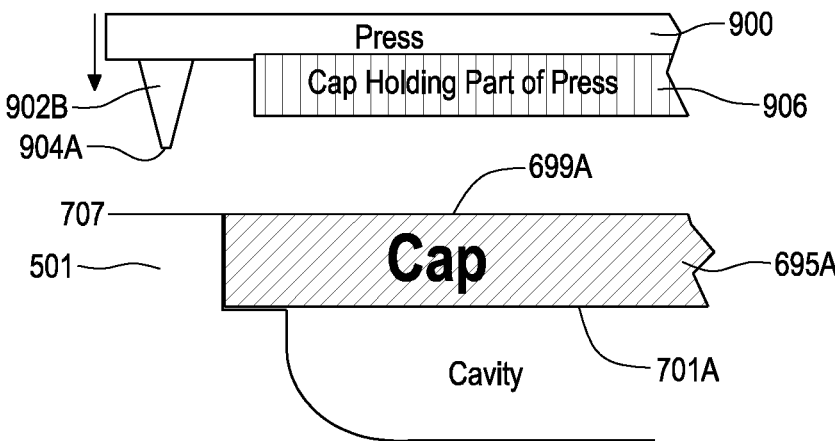
FIG. 9B is an exploded cross-sectional view of a portion of the flow substrate of FIG. 9A with a press comprising a cap holding element, with the press in a first position, in accordance with an aspect of the present invention.
Figure 9C:
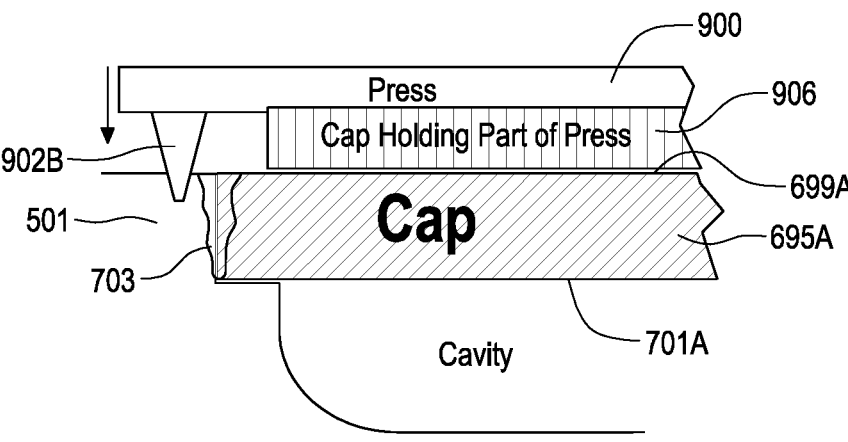
FIG. 9C is the exploded cross-sectional view of the portion of the flow substrate of FIG. 9B with the press in a second position, in accordance with an aspect of the present invention.

FIGS. 9A-C are still another embodiment of a weld cap and a substrate body. FIG. 9A is a cross-sectional view of a substrate body 501 and a weld cap 695A. The weld cap 695A can be substantially flat with no protruding features and have a first weld cap surface 699A and a second weld cap surface 701A. The weld cap 695A can be coupled with the opening of the substrate body 501. In some embodiments, the first weld cap surface 699A can be in the same plane as the adjacent substrate body 501. In other embodiments, the first weld cap surface 699A can be higher (e.g., protruding above the adjacent substrate body 501) or lower (e.g., recessed into the substrate body 501) than the substrate body 501.

A press 900 can include a pressing feature 902B with a pressing surface 904A that is a triangular (e.g., pointed; a wedge) shape where one corner of the triangular shape of the pressing feature 902B contacts the substrate body 501. The press 900 can also comprise a cap holder 906 that is configured to hold the weld cap 695A in place while the press 900 is engaged with the weld cap 695A. The cap holder 906 can be, for example, spring-loaded (e.g., by including a spring, and/or by using a material that is deformable and inherently provides a spring force) to provide a constant force on the weld cap 695A when the press 900 is exerting force on the weld cap 695A.

The pressing surface 904A can deform a portion of the substrate body 501 adjacent to the weld cap 695A and fill the gap between the weld cap 695A and the substrate body 501 with deformed material from the substrate body 501 and the weld cap 695A and create a swaged joint 703, while the cap holder 906 is in contact with a portion of the weld cap 695A to limit and/or prevent movement of the weld cap 695A.

After pressing, the deformed material from the substrate body 501 and weld cap edge fills the gap and the weld cap 695A can be welded in place with a weld process as described herein. A benefit of this design is that additional features on the weld cap and/or substrate body are avoided, which reduces the costs for those parts.

Figure 10A:
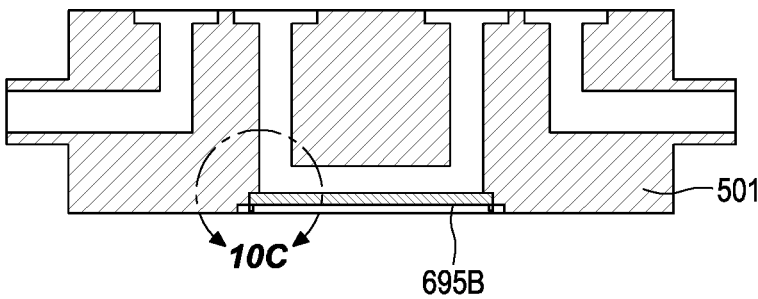
FIG. 10A is a cross-sectional view of another embodiment of a flow substrate, in accordance with an aspect of the present invention.
Figure 10B:
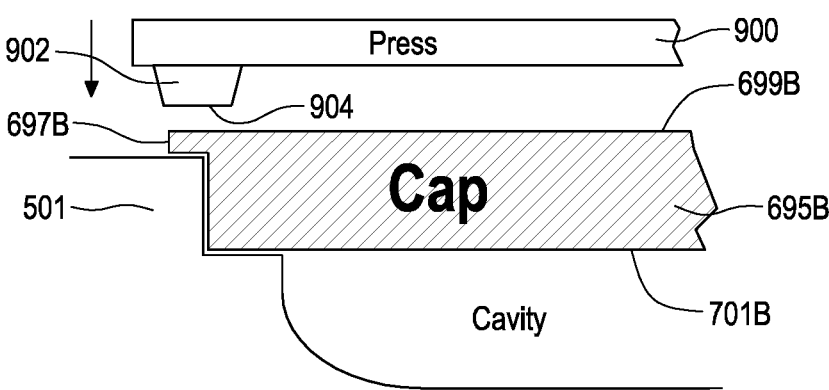
FIG. 10B is an exploded cross-sectional view of a portion of the flow substrate of FIG. 10A with a press in a first position, in accordance with an aspect of the present invention.
Figure 10C:
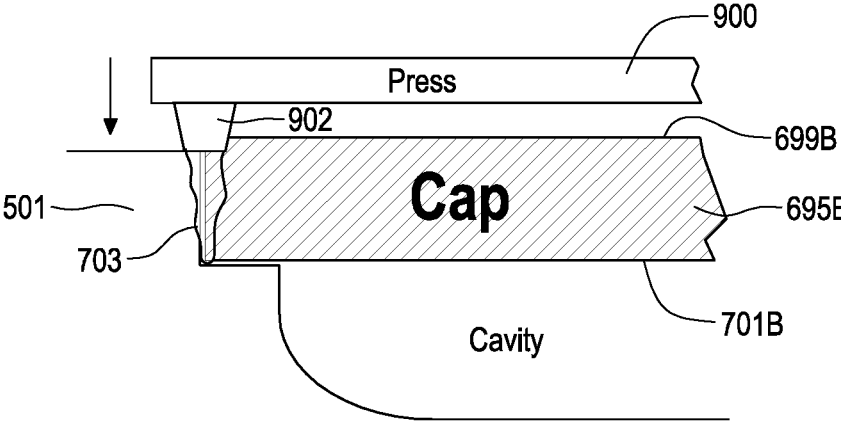
FIG. 10C is the exploded cross-sectional view of the portion of the flow substrate of FIG. 10B with the press in a second position, in accordance with an aspect of the present invention.

FIGS. 10A-C show another embodiment of a weld cap and a substrate body. FIG. 9A is a cross-sectional view of a substrate body 501 and a weld cap 695B The weld cap 695B can have a first weld cap surface 699B and a second weld cap surface 701B. The weld cap 695B can be substantially flat with a weld cap lip 697B that is planar with the second weld cap surface 699B (e.g., the weld cap lip 697B effectively makes the second weld cap surface 699B a bit larger than the first weld cap surface 699B would be without the weld cap lip present).

When the weld cap 695B is coupled with the substrate body 501, the weld cap lip 695B can contact a first portion of an opening (e.g., a lip or an edge of the opening) and the second weld cap surface 701B can contact a second portion of the opening (e.g., a weld edge). In this embodiment and as illustrated, the first weld cap surface 699B is higher (e.g., protruding above the adjacent substrate body 501) than the substrate body 501. A press 900 can have a pressing feature 902 with a pressing surface 904 that is planar and the pressing surface 904 can contact the weld cap lip 697B and deform the weld cap lip 697B to fill the gap between the weld cap 695B and the substrate body 501 and create a swaged joint 703. The pressing feature 902 can also comprise an angled surface adjacent the pressing surface 904 to push the pressed (i.e., swaged) material toward the gap between the weld cap 695B and the substrate body 501.

After pressing, the deformed weld cap edge can fill the gap between the weld cap 695B and the substrate body 501 and the weld cap 695B can be welded in place with a weld process as described herein. A benefit to this design is that the weld cap does not have a complex design and the substrate body does not include additional features which can keep the cost low.

Figure 11A:
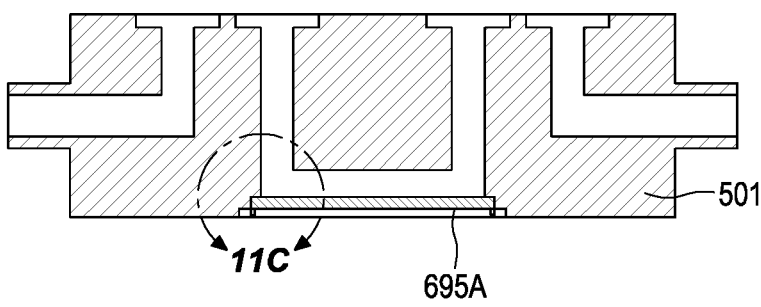
FIG. 11A is a cross-sectional view of another embodiment of a flow substrate, in accordance with an aspect of the present invention.
Figure 11B:
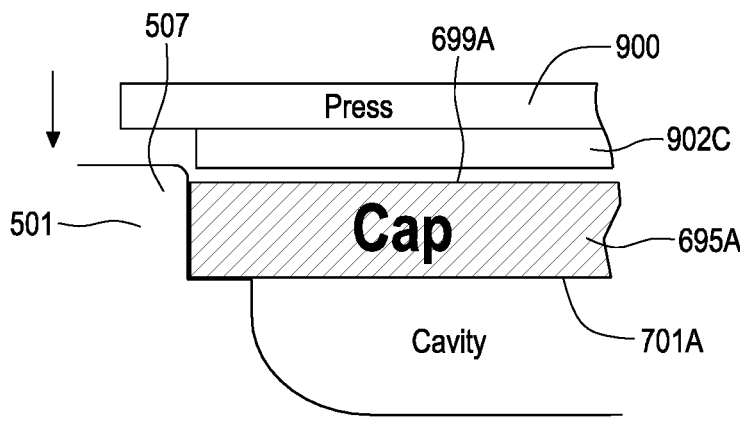
FIG. 11B is an exploded cross-sectional view of a portion of the flow substrate of FIG. 11A with a rounded edge proximate an opening and a press in a first position, in accordance with an aspect of the present invention.
Figure 11C:
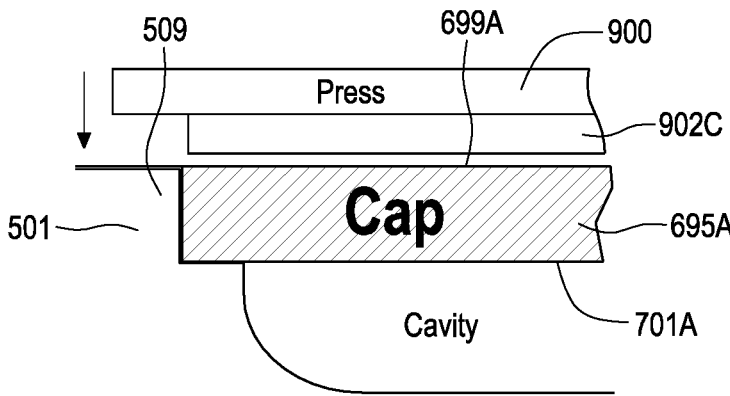
FIG. 11C is the exploded cross-sectional view of the portion of the flow substrate of FIG. 11A with a square edge proximate an opening and a press in a first position, in accordance with an aspect of the present invention.

FIGS. 11A-C show yet another embodiment of a weld cap and a substrate body. FIG. 11A is a cross-sectional view of a substrate body 501 and a weld cap 695A. FIG. 11B is a partial cross-sectional view of the weld cap 695A coupled with an opening of the substrate body 501. The weld cap 695A can be in the same plane as the substrate body 501 (e.g., the first weld cap surface 699A can be planar with the adjacent surface of the substrate body 501). The opening of the substrate body 501 can have a rounded corner 507 which can aid with alignment (e.g., serve as a guide) of the weld cap 695A during insertion and pressing of the weld cap 695A into the substrate body 501. FIG. 11C is a partial cross-sectional view of the weld cap with an opening of the substrate body 501 with a sharp corner 509 (i.e., non-rounded, right angle, straight, etc.).

A press 900 can include a pressing feature 902C with a pressing surface. The pressing surface can correspond to the shape of the weld cap 695A (e.g., circular, oval, rectangular, triangle etc.) to place equal pressure around the weld cap 695A while pressing of the weld cap 695A into the substrate body 501.

In this embodiment, the press 900 can force the weld cap 695A into the opening (e.g., a friction fit of the weld cap 695A into the substrate body 501). After pressing, the weld cap 695A can be welded in place with a weld process as described herein. In addition to being an economical option due to the minimal amount of machining needed for the weld cap and substrate body, this embodiment can be useful in applications that do not require complete closure of the gap between the weld cap 695A and the substrate body 501.

FIGS. 12A-C show another embodiment of a weld cap and a substrate body. FIG. 12A is a cross-sectional view of a substrate body 501 and a weld cap 695. FIG. 12B1 is a partial cross-sectional view of the weld cap 695 coupled with an opening of the substrate body 501. The opening of the substrate body 501 can have a rounded corner 507 which can aid with alignment of the weld cap 695 during insertion and pressing of the weld cap 695 into the substrate body 501. FIG. 12B2 is a partial cross-sectional view of the weld cap 695 with an opening of the substrate body 501 with a sharp corner 509 (i.e., non-rounded, right angle, straight, etc.). The weld cap 695 can be coupled with the substrate body 501 using adhesive 705 (i.e., glue) or similar mechanism (e.g., industrial metal bonding or non-metal bonding glue to create a bonded joint). FIG. 12C is a cross-sectional view of the bonded joint with glue 705 between the weld cap 695 and the substrate body 501.

The adhesive can be applied to the substrate body 501, the weld cap 695, or both using any application method (e.g., spraying, taping, dispensing, brush etc.). This configuration can be used for coupling metal, plastic, composite and other non-metal applications that are not conducive to welding. The adhesive can be selected to be resistant to the type of material flowing through the system to allow for a leak-free coupling (i.e., joint, connection, etc.). A benefit of using adhesive to couple the weld cap to the substrate body includes the ability to create a leak-free coupling that is resistant to the material flowing through the system without the time and cost associated with welding the weld cap to the substrate body.

FIGS. 13A-B show a plug for a substrate body and a press that can be used to couple the plug and the substrate body. FIG. 13A is a top view of a plug 950 that can be used to seal an opening in a substrate body (not shown in FIG. 13A). FIG. 13B is cross-sectional view of the plug 950 coupled with a substrate body 501 with a press 900 positioned adjacent to the outside surface of the plug 950 and substrate body 501 (prior to pressing the plug 950 and creating a swaged joint between the plug 950 and the substrate body 501. Any of the configurations/methods described above can be used to couple the plug 950 to the substrate body 501. Additionally, any of the configurations related to FIGS. 1-5 (and related discussion) can also be used with to attach the plug to the substrate body.

FIGS. 14A-B show a tube stub for a substrate body and a press that can be used to couple the tube stub and the substrate body. FIG. 14A is a top view of a tube stub 960 that can be coupled with an opening in a substrate body 601. FIG. 14B is cross-sectional view of the tube stub 960 coupled with the substrate body 601 with a press 900 positioned adjacent to and around the tube stub 960 and adjacent to the substrate body 601 (prior to pressing the substrate body and creating a swaged joint between the tube stub 960 and the substrate body 601 by pressing on a portion of the substrate body 601. Any of the configurations/methods described above that do not deform the wall of the tube stub (e.g., only swage material part of the substrate body, adhesive, etc.) can be used to couple the tube stub to the substrate body including swage lips on the body.

FIG. 15 is a flow chart showing steps in a method of forming a substrate body coupled with a weld cap. A method 1000 can comprise a step of placing a weld cap proximate an opening in the substrate body (represented by box 1002), a step of pressing one or more of the weld cap and the substrate body with a pressing tool, wherein the pressing tool comprises a pressing element (represented by box 1004), a step of securing the weld cap to the substrate body (represented by box 1006), and welding the weld cap to the substrate body (represented by box 1008). The securing step 1006 can include using one or more of a swaged joint, an adhesive joint, and a welded joint as described herein. The welded joint can include the use of any suitable weld process as described herein. The weld cap can have any of the features and/or configurations described herein. The pressing tool can also have any features and/or configurations described herein to cooperate with a corresponding weld cap.

What is claimed is:

1. A flow substrate comprising:

a substrate body formed from a solid block of a first material, the substrate body having a first surface and a second surface opposing the first surface;

a plurality of pairs of component conduit ports defined in the first surface of the substrate body;

a plurality of fluid pathways extending between each respective pair of component conduit ports and in fluid communication with each component conduit port of the respective pair of component conduit ports, each respective fluid pathway being formed in the second surface of the substrate body; and at least one cap formed from a second material, the at least one cap having a first cap surface that is constructed to seal at least one fluid pathway of the plurality of fluid pathways, and a second cap surface opposing the first surface;

wherein the substrate body includes an opening configured to couple with the at least one cap, and wherein the at least one cap further comprises a weld cap lip that extends from the second cap surface, and wherein the weld cap lip is a raised lip that extends above a directly adjacent surface of the substrate and in an opposite direction from the first surface.

2. The flow substrate of claim 1, wherein the weld cap lip is not planar with the first cap surface.

3. The flow substrate of claim 1, wherein the substrate body comprises a substrate body lip.

* * * * *